United States Patent Office 3,699,042
Patented Oct. 17, 1972

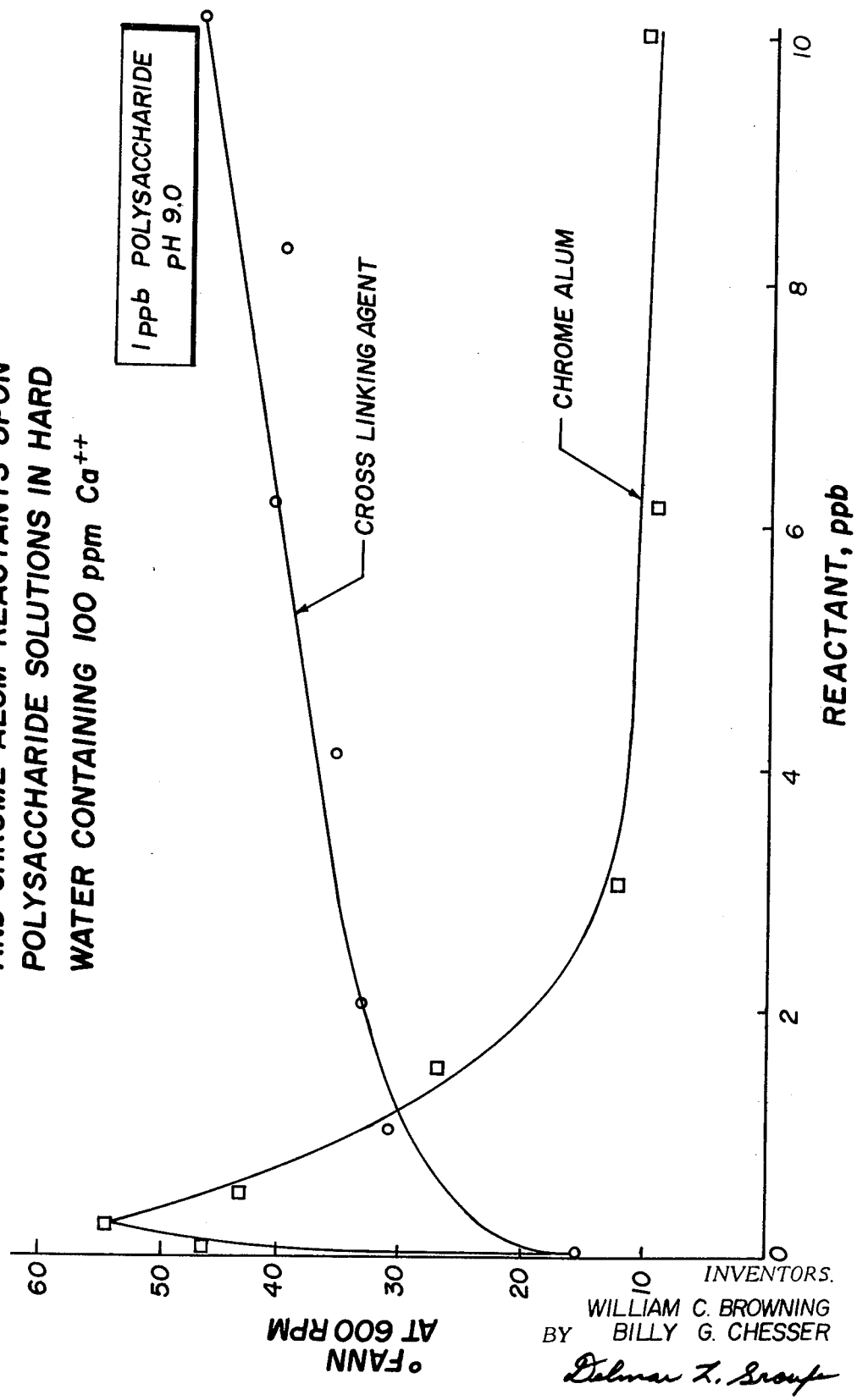

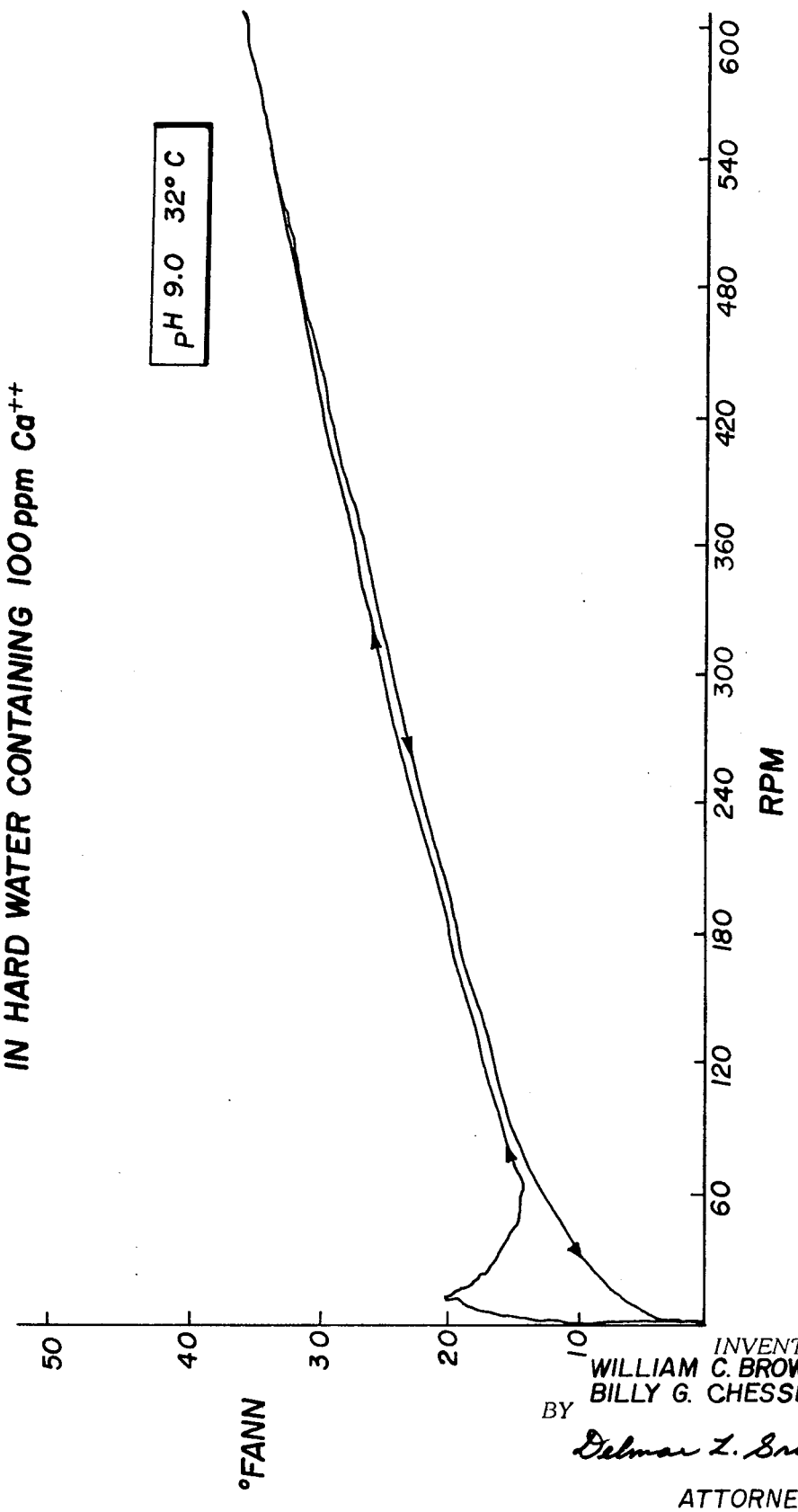

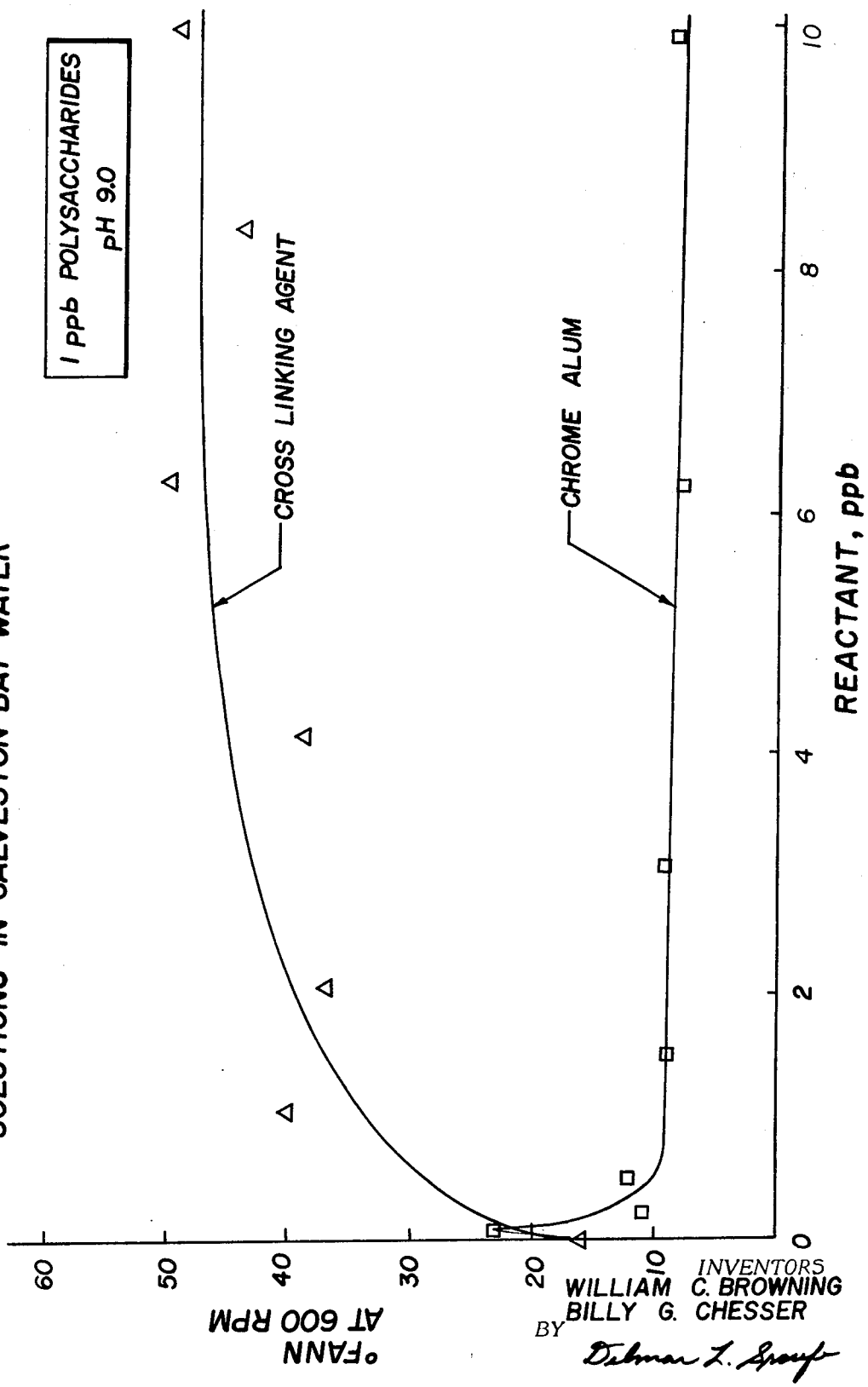

3,699,042
DRILLING FLUID COMPOSITION AND PROCESS FOR DRILLING SUBTERRANEAN WELLS
William C. Browning and Billy G. Chesser, Houston, Tex., assignors to Milchem Incorporated, Houston, Tex.
Continuation-in-part of application Ser. No. 47,325, June 18, 1970. This application Nov. 16, 1970, Ser. No. 89,626
Int. Cl. C10m 3/48
U.S. Cl. 252—8.5 C                5 Claims

ABSTRACT OF THE DISCLOSURE

The present invention relates to a novel drilling fluid composition consisting essentially of (1) a macromolecular polysaccharide aqueous solution, and (2) a metal ion buffered cross-linking agent for said solution consisting essentially of (a) an organic polyelectrolyte ligand component, and (b) a metal component of the first series of the transition elements of the Periodic Table. This drilling fluid has been found to provide enhanced rheological properties without obtaining metal ion overtreatment characteristics. In a preferred form, said drilling fluid has a metal ion buffered cross-linking agent additionally containing a compound of a metal from Group II of the Periodic Table. A process for drilling a subterranean well with the present drilling fluid composition is also incorporated.

CROSS REFERENCE TO RELATED APPLICATION

The present application is a continuation-in-part application for our copending application Ser. No. 47,325, filed June 18, 1970.

BACKGROUND OF THE INVENTION

(1) Field of the invention

This invention relates to a drilling fluid composition and a process for drilling subterranean wells utilizing said composition.

(2) Description of the prior art

When drilling subterranean wells in order to tap deposits of, for exampe, oil or gas, and in particular when utilizing a rotary drilling method comprising a bit to which is attached a drill stem, a drilling fluid or "mud," as it is commonly referred to by those skilled in the art, is circulated to the bottom of the borehole, ejected through small openings in the drill bit at the bottom of the hole, and then returned to the surface through the annular space between the drill stem and the wall of the borehole where it may be mechanically and/or chemically treated and recirculated. When casing has been inserted into the hole, the fluid will circulate between the drill stem and the internal wall of the casing. Reverse circulation, in which the drilling fluid is injected into the hole through the annular space and returned to the surface by means of the drill stem, is sometimes utilized.

Drilling fluids serve multi-functions and must have a variety of properties. For example, a drilling fluid for utilization as discussed above must be a liquid of such viscosity that it may serve as an effective transporter of cuttings from the borehole to the surface for removal. A drilling fluid must also prevent excessive amounts of fluid from flowing from the borehole into surrounding formations by depositing on the wall of the hole a thin but substantially impervious filter cake. In addition, a drilling fluid must also be able to hold solids in suspension, preventing their return into the bit area when the drilling rate is reduced or the drilling temporarily terminated. This property is obtained by utilizing additives which will give to the drilling fluid a gel structure at increased viscosities.

A drilling fluid must also serve as a weighting agent, exerting pressure on the surrounding formations, thus preventing possible caving of the bore hole by highly pressurized oil or gas in the formation. Finally, a drilling fluid must also serve as a lubricating agent for the bearings utilized in the drill bit and on the surface of the bit teeth.

Reduction of the overall cost of drilling oil and gas wells is an imperative economic requirement. It is now fully recognized that the major target is not in reduction of unit price of individual drilling fluid additives but in reduction of overall drilling costs. In recent years increased effort has been made to re-evaluate current practices and to devise means of using available equipment, materials, and techniques in practical ways to decrease drilling time with the objective of lowering costs.

The relation of drilling fluid properties to penetration rate has been particularly examined, and it has been generally found that low clay solids content, with associated decrease in viscosity, resulted in significant increases in drilling rate. Emphasis in recent years has been placed upon maintaining "low solids" muds in which the total volume of clay solids in unweighted systems was no more than 4%, with a drilled solids-to-bentonite ratio of less than two to one. The use of centrifugal and other mechanical means to remove high surface area drilled solids has commanded particular attention.

Microbit studies have shown that solutions of 0.25 to 0.5% of carboxymethylcellulose and of a modified polysaccharide increased penetration rates in sandstone and limestone over that of water only. However, high concentrations of these polymers were shown to decrease drilling rates to less than that of water. It was concluded from this work that drilling rates with pregelatinized starch and modified polysaccharide suspensions correlated with filtration rate—the lower the filtration, the slower the drilling rate. In these studies, however, the effect of high shear rates on apparent viscosity was not studied.

The effect of drilling fluid hydraulics upon penetration rate has been investigated with the conclusion that the solids content of a drilling fluid does not affect drilling rate for a given kinematic viscosity. Likewise, it has been found that filtration rate per se does not affect penetration rate for a given kinematic viscosity. It has further been found that it is the apparent viscosity at bit nozzle shear rates that correlates with penetration rate—not flow properties measured at shear rates of 1,000 sec.$^{-1}$ or less. Furthermore, it has been discovered that shear-thinning non-Newtonian fluids are required to provide proper hole cleaning at lower annular velocities, minimize erosive effects, and at the same time enable water-thin viscosities to be utilized at the bit. These technologies are making the old concepts of chemical treatment obsolete. Originally the prime chemical problem was how to thin "thick" muds, and various chemical expedients were devised to lower the Marsh Funnel, Stormer or Fann viscosities of thickened mud of high clay solids content.

The use of "thinners" to lower apparent viscosities and gel strengths of clay suspensions is now tending to be regarded by the industry as undesirable. Once, considerable effort was expended in attempting to evaluate the agent most effective in "thinning" or "dispersing" a mud. The use of such agents has been increasingly regarded in recent years as a sure way to increase drilling costs by reduction in penetration rate as a result of automatically maintaining a higher solids content in the mud.

Under the impact of evolving drilling technology, another cornerstone is weakening—the belief that bentonite is the essential drilling mud constituent. Drilling mud has through the years been practically synonymous with "bentonite suspension." Bentonite has tended to be regarded as an all-purpose agent. In water suspension it is used to create viscous slurries for hole cleaning, to control filtration rate, to stabilize the borehole by "plastering," to lubricate the drill string, to reduce rotational torque, and to generally treat mud problems. However, there is a growing recognition that bentonite or clay suspensions have serious limitations as a drilling fluid base. The attention paid to the adverse effect of solids upon penetration rate has revealed that the higher the surface area for a given weight of suspended solids, the more detrimental is the effect. If barite is used instead of drilled solids to increase mud weight, three-fourths of the adverse effect of solids on drilling rate can be avoided. The effect of moderate-yield drilling clay in reducing drilling rate is about 40% worse than drilled solids.

On an equivalent-weight basis, colloidal bentonite would have by far the greatest adverse effect on penetration rate. The presence of calcium ions or thinners, or, worse yet, both thinners and calcium ions, i.e. gyp muds, would require increased amounts of bentonite to produce necessary hole cleaning rheology in the annulus without any accompaniment of shear thinning to lessen the decrease in penetration rate.

Bentonite-based muds are variable in performance and do not lend themselves to automation controls. Bentonite suspension rheology varies markedly in different water solutions. For example, bentonite yields very poorly in calcium-containing waters and, if already hydrated, will flocculate strongly when contaminated with electrolytes; but further contamination may cause the thick flocculated slurry to "break over" to a thin slurry. Slurries of bentonite exhibit variable rheology with increasing temperature; in some instances yield values increase; in others they decrease. In addition, filtration rate control declines in efficiency at higher temperatures. Even more significant, the chemical treatment required to promote yield of bentonite is exactly the same as that acting to create hole enlargement and dispersion of mud-making formation clays. Furthermore, transported bentonite particles are well known to damage the productivity of producing sands. Mechanical clay solids removal is complicated in any bentonite-based mud, because any treatment that acts to separate and remove drilled solids tends to remove bentonite also. The deficiencies and limitations of bentonite provide the incentive for developing a new drilling fluid using macromolecular viscosity building substitutes for clay.

The use of high-weight (20 p.p.g.) non-clay-based drilling fluid has been known to the prior art. In this non-clay mud, a polysaccharide (starch) is used for rheological property control as well as filtration rate control. One hundred twenty-eight pounds of salt per barrel of water will supply inhibition. The mud's ability to retard dispersion of susceptible formations is assisted by maintaining a low peptizing pH of 7.0 to 7.5 and by the water-binding characteristics of the starch. The shear-thinning properties of this mud are not known, but in this instance, as in many others, decreased cost by decreased mud making and wellbore stabilization overshadowed other effects and led to a satisfactory conclusion.

Although drilling hydraulics are undoubtedly of great importance in lowering drilling costs, attention must be paid to the problems encountered while drilling troublesome shales. At current costs per day, rig-time delays due to hole trouble are costly. Merely maintaining low viscosity and low solids is not the complete answer. Increased penetration rate lowers cost while drilling, but costs continue to accumulate even when not drilling ahead. Therefore, all factors related to enforced downtime—mechanical failures and maintenance, hole cave-in, reaming, fill-on-bottom, twist-offs, corrosion problems— all deserve equal attention.

Rheologoy control in the field should not be concerned with thinning muds but should be entirely concerned with adjusting flow properties to meet the individual mechanical and hydraulic engineering requirements of the drilling location and the drilling rig equipment available. Electrolytic contamination from the drilled formation should not require any particular treatment. Mud making should be minimized in unconsolidated or non-hardened clay formations. Diffusion and capillary fluid invasion should be minimized in plastc and indurated clays. Rigside control of the drilling fluid characteristics should lend itself to automation requirements. Specific problems of water or hole mud loss in porous sands or fractures should be controlled by specific additives that are chemically and operationally compatible with the main drilling fluid composition, as should be the case with all other special additives. Specifically, the drilling fluid should be designed to deliver maximum horsepower at the bit but reduce horsepower requirements for deep drilling. By enabling lower annular velocities to be maintained, the fluid should show maximum effectiveness in removal of cuttings at the shaker screens and have properties that enhance centrifugal solids separation when required. The fluid should be designed to minimize the waste and discarding of chemicals for both economic and environmental pollution considerations. Therefore, the ultimate objective of drilling fluid design would be the creation of a substantially closed system operation.

The classical drilling fluid characteristics that are a function of the rheology of the fluid are:

(1) Cleaning the hole bottom (bit action);
(2) Removing cuttings from the hole;
(3) Settling of cuttings in the hole and surface pits.

For item (1) as low a viscosity as possible is desired, preferably not greater than water. For item (2) as high a viscosity as practical is desired under the shear-rate conditions of the annulus. For item (3) rheological structure or gel strength to meet dual and contradictory conditions is required. As demonstrated by Stokes' law, if the density of the suspended particle is greater than that of the fluid, settling will occur. The viscosity of the fluid controls only the rate of settling. Thixotropy or reversibile gel-viscous properties are required to prevent settling in the hole and solids removal on the surface.

To best meet conditions (1) and (2) a shear-rate thinning fluid is required. A good shear-thinning drilling fluid has a consistency that is adequate for hole cleaning in the shear-rate conditions of the annulus. At the shear-rate conditions of the bit the apparent viscosity should approach that of water.

Various investigators are of the belief that penetration rate attributable to hydraulic factors will begin to decline rapidly if the apparent viscosity at the bit exceeds approximately 10 centipoises. A well deflocculated mud behaving in a Newtonian manner will drill at a high penetration rate if its viscosity does not exceed ten centipoises, but high annular velocities will have to be maintained to clean the hole. A mud of Newtonian characteristics, with sufficient consistency to provide good hole cleaning, will have too great a viscosity at bit shear rates to give good penetration rate hydraulics.

The resistance-to-shear properties are generally regarded to be adequately described by a power law function. The empirical Ostwald-de Waele-Nutting model, or so-called power law equation, is given as $$\tau = m(du/dr)^n$$

This expression involves only two rheological parameters—the consistency index $m$ and the flow behavior index $n$. Where $u$ is strain, $\tau$ is stress and $r$ is rate. This simple equation fits almost all pseudoplastic behavior over a tenfold change of shear rate and the pseudoplastic behavior of many polymeric materials over changes in shear rate of thirty- or forty-fold.

Some rheologists have objected to this equation because it is purely empirical and not derived from any physical concepts. The power law is deficient in that it predicts an infinite viscosity for pseudoplastics as the shear rate goes to zero—and a zero viscosity at infinite shear rates. As a practical tool, flow behavior under very high shear rates may be correctly represented by fitting the equation to the experimental data for the shear-rate region of concern, but generally poor representation is given at very low shear rates.

The drilling fluid functions relating to bit action and hole cleaning in the annulus have received special mathematical attention, but the derived relationships are concerned with pseudoplastic behavior in which the internal friction created by intermolecular or interparticle interactions smoothly decrease with increasing rates of shear. The mathematical expressions derived are only descriptive of systems in a state of flow.

The third function of a drilling fluid—the prevention of settling of barite and cuttings in the hole under static conditions and the removal of sand and cuttings by sedimentation in surface pits, which necessarily involves conditions of thixotropy—has not been accorded the same mathematical attention.

As is well known and described in the Stokes equation, viscosity can only affect the rate of settling, not prevent it. If settling of cuttings is to be prevented, some rheological structure, gel strength or plastic characteristics must be present, preferably under conditions of thixotropic behavior. Thixotropic behavior is both time and shear dependent, but the usual Bingham plastic behavior utilized in drilling fluid engineering, in connection with thixotropic behavior, ignores the time factor.

The usual explanation of the Bingham plastic behavior assumes that the fluid at rest contains a three-dimensional structure of a rigidity sufficiently great to resist a finite stress. When this stress is exceeded, the structure breaks down completely and the fluid displays a linear relationship between shear stress and shear rate. The variable shear rate relationships between yield and linearity are explained on the basis of plug flow variations, although some modern rheologists consider this an inadequate and inaccurate explanation.

The stress-strain relations of viscous, pseudoplastic and Bingham plastic systems are as follows:

(1) Coefficient of viscosity $\eta$ $$F/A = \tau = n(du/dr)$$

where $F/A$ = force per unit area of shearing stress and
$du/dr$ = change in velocity $v$ over the distance $r$, or rate of shear.

(2) Apparent vscosity $\eta_A$ $$\tau = \eta_A (du/dr)$$

(3) A Bingham body
$U$ is the coefficient of plastic viscosity and
$f$ is minimum shearing stress or yeild value $$\tau - f = U(du/dr)$$

The apparent viscosity of a Bingham body decreases with increasing rates of shear, even for a constant plastic viscosity, as can be shown by comparing the third equation with the second equation:

(4)
$$\eta_A = U + \frac{f}{du/dr}$$

Despite the common use of the Bingham body relationships, true Bingham bodies are rarely encountered and almost never in drilling muds.

Most drilling muds exhibit thixotropic flow behavior, and the word itself indicates a material that decreases in consistency when subjected to shear but rebuilds consistency when at rest. The time factor in thixotropic phenomena cannot be ignored. If a drilling fluid system is to be broadly and efficiently utilized, it must exhibit thixotropic behavior and this behavior must be controllable. It is difficult to derive mathematical relationships to properly describe pseudoplastic behavior; it is much more difficult when thixotropic behavior is also present.

The drilling fluid composition of the present invention has merit in approaching the goal of overall lower drilling costs. In this system no clays are added to control mud properties. Rheological control at high and low shear rates is maintained by the proper addition of shear rate thinning macromolecular polysaccharide materials.

In the past, those skilled in the art have relied heavily upon water soluble salts of polyvalent metal cations from Group III through Group VIII of the Periodic Table, such as chromium, to provide cross-linking of macromolecular polysaccharide materials in order to enhance their thixotropic, shear-thinning characteristics when used as non-clay-based drilling fluid additives. Chromic salt-containing compounds, such as chromium chloride, basic chromium sulfate, chromium aluminum sulfate, and the like, have been particularly utilized. However, the successful use of these materials alone has been somewhat limited because of a metal ion overtreatment effect on the macromolecular polysaccharide material. For example, chromium chloride and chrome alum have been found to overtreat the macromolecular polysaccharide material, i.e., when the cross-linking agent has been added in a concentration excess of about 0.5 p.p.b. (lb./bbl.), this lowering of apparent viscosity due to overtreatment will occur and will cause the solution to be "thinned" rather than "thickened." Therefore, increased levels of the usual metal salt cross-linking agent can produce an effect opposite of what was intended.

There is, therefore, industrial and commercial need of a drilling fluid composition which will provide a mechanically and chemically stable cross-linked macromolecular polysaccharide solution not subject to an overtreatment effect. We have found that certain organic polyelectrolyte ligands may be reacted with certain compounds containing a metal from the first series of the transition elements of the Periodic Table to form a chelating component in conjunction with certain macromolecular polysaccharide materials to form a unique drilling fluid composition. The organic chelates in the present drilling fluid are not subject to the overtreatment effect characteristic of inorganic metal salts of the elements present in Group III through Group VIII of the Periodic Table.

It is an object of the present invention to provide a macromolecular polysaccharide drilling fluid composition with an improved cross-linking agent.

It is also an object of the present invention to provide a drilling fluid composition containing a polyelectrolyte ligand in a metal ion buffered cross-linking agent to treat aqueous macromolecular polysaccharide solutions to produce a positive and controlled thickening effect, without any undesired overtreatment or "thinning" effects.

It is also an object of the present invention to prevent metal ion overtreatment of the macromolecular polysaccharide drilling fluid component, resulting in the prevention of the decrease in solution viscosity.

It is a further object of the present invention to provide a method of drilling subterranean wells utilizing the drilling fluid composition of the present invention.

Other objects and advantages of the use of the present invention will be readily appreciated from a reading of the description of the invention, the drawings, the examples, and the claims which follow.

BRIEF DESCRIPTION OF THE DRAWINGS

FIG. 4 is a graphical illustration of the non-"overtreating" characteristic of the drilling fluid of the present invention.

FIG. 5 is a rheogram showing the elimination of metal ion over-treatment effect on a macromolecular polysaccharide solution using 6 p.p.b. of the metal ion buffered cross-linking agent ligand of the present invention and 1 p.p.b. macromolecular polysaccharide material.

FIG. 6 is a graphical illustration of the room temperature apparent viscosity of the drilling fluid of the present invention compared with the effect obtained by the use of chrome alum in conjunction with a macromolecular polysaccharide material in Galveston Bay water. The desirable controlled rheoogy obtained with our drilling fluid composition is strikingly apparent.

SUMMARY OF THE INVENTION

Figure 1:
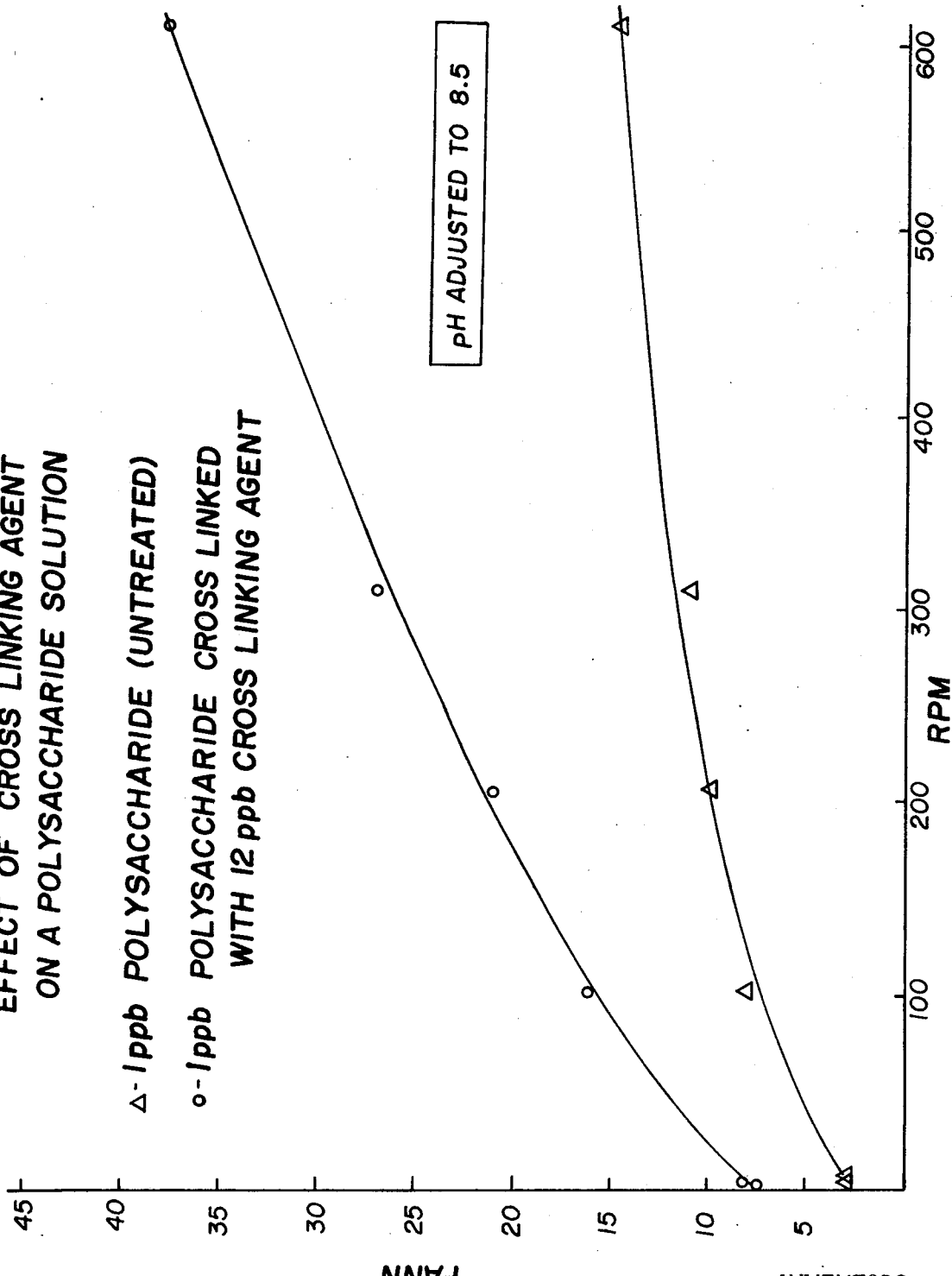
FIG. 1 is a graphical illustration comparing the room temperature viscosities of a solution of the drilling fluid of the present invention and a solution containing only a macromolecular polysaccharide material.

The present invention comprises a drilling fluid composition consisting essentially of (1) a macromolecular polysaccharide aqueous solution, and (2) a metal ion buffered cross-linking agent for said solution consisting essentially of (a) an organic polyelectrolyte ligand component and (b) a metal component of the first series of the transition elements of the Periodic Table. In a preferred form, said drilling fluid has a buffered cross-linking agent additionally containing a compound of a metal from Group II of the Periodic Table. A process for drilling a subterranean well with the present drilling fluid composition is also incorporated.

DESCRIPTION OF THE PREFERRED EMBODIMENTS

When discussing macromolecular polysaccharide materials, we mean to refer to the use of polysaccharides or gums technically employed in industry. These organic materials are dispersible in either cold or hot water to produce viscous mixtures or solutions. Of particular interest are exudate gums, seaweed gums, seed gums, and starch and cellulose derivatives and chemically-modified derivatives thereof. Other macromolecular polysaccharides, such as dextrins and dextrans derived from corn starch, potato starch, and other soluble starches, as well as polysaccharide biopolymers produced by the action of bacteria on a carbohydrate, may be utilized. Our drilling fluid composition is particularly effective when macromolecular polysaccharide materials produced by bacteria action of the genus Xanthomonas on carbohydrates are incorporated therein. These bacteria may be of the species *Xanthomonas begoniae, Xanthomonas campestris, Xanthomonas carotae, Xanthomonas corylina, Xanthomonas gummisudans, Xanthomonas hederae, Xanthomonas incanae, Xanthomonas lespedezae, Xanthomonas malvacearum, Xanthomonas holcicola, Xanthomonas papavericola, Xanthomonas phaseoli, Xanthomonas pisi, Xanthomonas translucens, Xanthomonas vasculorum, Xanthomonas vesicatoria*, and the like. This macromolecular polysaccharide material may be obtained by utilizing methods such as those disclosed in U.S. Pats. Nos. 3,000,790, 3,020,206, 3,228,855, 3,455,786, and 3,485,719. This particular macromolecular polysaccharide appears to be a relatively high molecular weight linear polymer with a beta-linked backbone containing D-glucose, D-mannose, and D-glucuronic acid with a mannose side chain for every eight sugar residues and possibly a 4,6-O (1-carboxy-ethylidene) D-glucose side chain residue for every 16 sugar residues. This polysaccharide contains about 3.0 to 3.5% pyruvic acid as a structural component attached to the glucose moiety in a ketal linkage. Acetic acid is also present as the O-acetyl ester in amount of about 4.7%. It is believed that the pyruvate-ketal linkage in the polysaccharide involves two glucose units in a unique structure. Studies have indicated that side chains are present in size and steric proportions equivalent to that of a non-reducing side-chain residue. The combined effect confers upon this particular polysaccharide the character of a linear polymer with seven protruding side chains for every 16 sugar residues. The indications are that few, if any, long side chains are present.

Solution viscosities of this polysaccharide are relatively insensitive to charge-neutralizing effects of inorganic electrolytes, and it appears that structural and steric factors are primarily responsible. The large number of side chains limits the flexibility of the polysaccharide chain and thus promotes shear-thinning behavior. The observed increases in viscosity of more concentrated solutions of the polysaccharide may be due to an increase in intermolecular association. The rather rigid polysaccharide chain remains in a more extended state which favors intermolecular association, as well as intermolecular entanglement, to produce rheological structure. The side-chain groups, however, limit the amount of intermolecular association by steric hindrance and prevent dehydration and precipitation of the polysaccharide by brines.

To enhance thixotropic characteristics and enable greater "viscosities" to be developed from a given amount of polysaccharide in solution, the phenomenon of "cross-linking" must be utilized. The mechanism of cross-linking is very important in the practical handling of the macromolecular polysaccharide and permits the rheological effectiveness of a given weight of polysaccharide to be doubled as well as provide enhanced hole-cleaning characteristics when utilized in the drilling fluid of the present invention.

Linear polymer chains can be joined together by monomers having two or more functional groups. When polymer molecules are connected together in this manner the polymer is said to be cross-linked. These cross-links may be formed by covalent, ionic-coordination or hydrogen bonds. The less stable cross-linking bonds can be broken by small amounts of heat or shearing stress. The vulcanization of rubber is a classic example of more permanent chemical cross-link bonding. Weak bonding, such as achieved through hydrogen bonding, induces only a labile structure that is easily disrupted by mechanical force.

If a thixotropic supporting structure is to be created to effectively prevent barite and drilled bit cuttings from settling during periods of quiescence, then a cross-linked supporting network must be established in the macromolecular polysaccharide solution. The cross-link bond, however, must be sufficiently weak to break under shear but reform very quickly as the rate of shear is decreased.

One of the ways to form a thixotropic gel structure is to add a "cross-linking agent," usually an electrolyte. Polysaccharide macromolecules having no ionized groups may be gelled by certain electrolytes by a complexing action; however, the structure of these carbohydrate-inorganic complexes is little explored. In many instances metal complexes are thought to be formed from adjacent hydroxyl groups which are said to be cis to each other. In almost all cases both cationic and anionic complexes are formed in alkaline solutions and are believed to primarily involve polyhydroxy anions and multivalent cations.

Treatment of a macromolecular polysaccharide with a trivalent chromium ion will produce a three-dimensional, complex-linked gel network. The rigidity of the resulting gel is proportional to the concentration of cross-links formed, and the concentration of cross-linked formed is dependent on the square of the concentration of macromolecular polysaccharide at the time of gelation.

With Xanthomonas-modified polysaccharides, it seems clear that more than cross-linking by ionic bonding is involved. Chelate formation involving carboxyl groups and pairs of adjacent hydroxyl groups may play a key part in polysaccharide cross-linking. This mechanism is dependent upon certain specific properties of the chromium ions in water solution.

The following discussion is confined to chromium chemistry for the purpose of illustration. It is to be realized that complex formation is particularly characteristic of metals of the first transition series. The specific properties of individual complexes will not only depend upon the properties of the metal and the ligand but on the details of their preparation.

The main valences of the trivalent chromium atom are not its only attractive forces. There are in addition three secondary forces or coordinate bonds which can attract ions and molecules from solution; chromium therefore has six coordinating positions.

The "simple" chromic ion exists in water solution in the form of the hexaquo complex

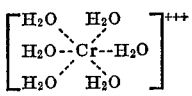

The coordinating positions may contain hydroxyl sulfate, formate, or other ions or groups capable of donating electrons and capable of six-fold coordination. Because of the strong complexing affinity of the hydroxyl ion, the hexaquo complex has a strong tendency to hydrolyze in aqueous solution to form basic complexes in which the primary valences of chromium are satisfied by hydroxyl groups.

If one hydroxyl unit is incorporated in the aquo complex, it may be represented as

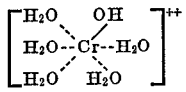

The aquo chromium complex is designated as one-third basic, because one-third of the primary valence bonds of the chromium atom are satisfied by a hydroxyl group. This reaction may be represented by $$[Cr(H_2O)_6]^{3+} + HOH \rightleftharpoons [Cr(H_2O)_5OH]^{2+} + H^+$$

which may be further simplified to $$[Cr]^{3+} + OH^- \rightleftharpoons [Cr-OH]^{2+}$$

It must be remembered that solutions of chromic salts usually contain a number of different complexes in equilibrium, both with each other and with free acid. These complexes may have different molecular weights and may be of different basicities. For any given solution, therefore, the analytically-determined basicity is only a statistical average. Similarly, solutions of the same salt prepared under different conditions, although having the same analysis, can contain completely different complexes. For example, a one-third basic chrome complex can also occur in the form of the following sulfato complex

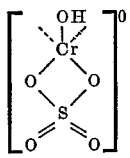

It should be noted that the sulfato complex carries a zero charge for the one-third basic aquo complex, whereas the previously shown one-third basic aquo complex carries a double positive charge. Other chromium complexes—for example, oxalato—may carry negative charges.

The strong attraction of the trivalent chromium ion for hydroxyl ions results in a three-step reaction in which the chromium associates with the first, second, and third hydroxyl groups. The hydrolyzing reactions are basic to the understanding of the cross-linking of macromolecular polysaccharide materials by chromium salts.

The first reaction, given in abbrevated form, is

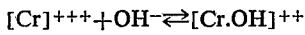

This reaction is very strong and occurs with an $H^-$ concentration of $10^{-12}$ (pH 2 or less). As the pH of the solution is raised to between pH 3 and pH 4, the second reaction occurs

Above the pH 4.0 the third OH enters the reaction, but the pH must be increased to 8 to 10 and the solution heated to near boiling to complete the reaction

If caustic is added to warm chromic salt solutions slowly and not enough for complete neutralization, then a polymerization-like reaction occurs instead of precipitation of the hydroxide.

This strong tendency for basic complexes to react together to form polynuclear complexes by linking two or more chromium atoms together through hydroxyl groups by hydrolytic and olation reactions may be represented by

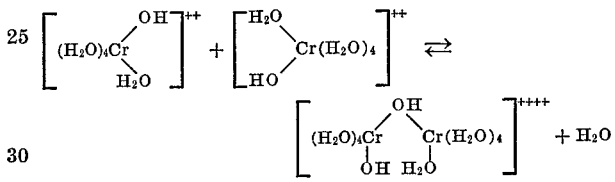

which, if the reacting groups are in the cis position, may form a completely olated complex as follows

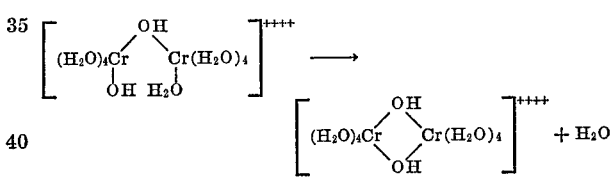

This process may continue to form three-dimensional complexes with particle weights of 400 to 1,000, which may be given the following two-dimensional representation:

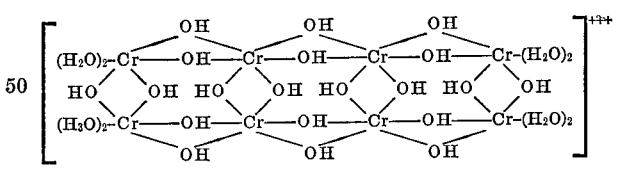

With the slow incremental addition of sodium hydroxide to a warm solution of chromic salt, the pH will rise and then slowly fall as complexes such as the above are formed. In this way an amount of sodium hydroxide can be added without precipitation but would cause precipitation if it were added all at once. The tendency for polynuclear complexes to be formed is accentuated by increasing the basicity, dilution or temperature of the solution.

Certain anions may replace coordinated aquo or hydroxo groups in a chromium aquo complex by "anion penetration." Anions that can enter the coordination sphere of chromium and displace OH groups can effectively prevent olation. Sulfate is such an anion and is commonly present in aquo chrome complexes prepared in the presence of sulfates.

Since a Xanthomonas-modified polysaccharide contains adjacent cis-hydroxyl groups, as well as pyruvic carboxyl groups in each linear chain, three-dimensional cross-linking by a basic chromium complex may be judged to be similar to the coordination bonding mechanism postulated for chrome tannage and may be represented as

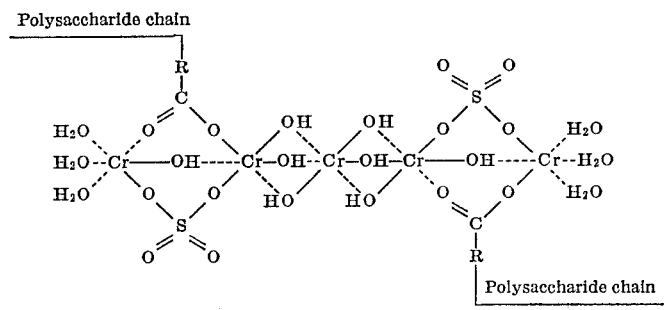

Polysaccharide chain

Cross-linking complexes, as represented by the above, are most active immediately after formation and decrease in activity after aging and heating. The freshly prepared complexes are of relatively low aggregate weight and contain a higher ratio of reactive "end groups," i.e., hydroxo and aquo units.

The above labile cross-linking effect is converted to an olated structure as the pH of the solution is increased; the sulfate in the complex is displaced by the hydroxy anion; and the hydroxyl group becomes shared with the chrominm atom through olation. This is shown in an abbreviated manner by

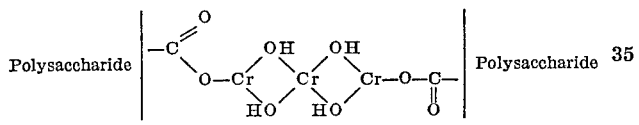

The ol groups are not so readily attacked by hydrogen ions or displaced by anions as are the aquo configurations.

With further increased pH, time and temperature, the linkages become more stable as the complex gives up hydrogen ions, and oxolation results:

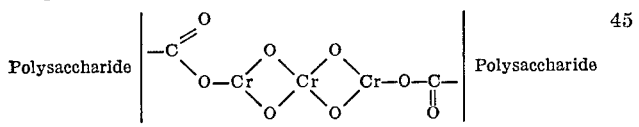

As previously noted, oxolation will occur between pH 8 and pH 10 with chromic sulfates or chlorides to provide a cross-link of sufficient strength to cause precipitation of the polysaccharide; hence, as it is customary to adjust drilling fluids to 9 pH or more, conditions are favorable to form oxolated chromium cross-links. If sufficient chromium is present in the solution, some of the polysaccharide will be precipitated and the greater the amount of chromium present, the more polysaccharide will be precipitated. This produces a characteristic "overtreatment" effect with increasing treatment of chrome alum or chrome chloride, because, literally, with increasing chromium, less and less polysaccharide is available to provide viscosity to the solution because of precipitation of the polysaccharide. The completely oxolated complex is quite inert.

This undesirable state of affairs can be corrected by the use of certain complexing agents referred to in the tanner's art as "masking agents." These complexing agents result in raising the pH at which precipitation will occur and increasing the amount of alkali which must be added to bring about precipitation. In other words, the introduction of masking agents into the solution inhibits the onset and development of oxolation of the polynuclear chrom hydroxides and thus acts to maintain the labile and dynamically-balanced cross-linking so desirable in a shear-thinning and thixotropic macromolecular polysaccharide for drilling fluid use.

The organic polyelectrolyte ligand utilized in the present drilling fluid composition may be better defined as a metal ion buffered cross-linking agent or chelating material. The term chelate was originally proposed to designate those cyclic structures which arise from the union of metallic atoms with organic and inorganic molecules or ions. If a molecule is to function as a chelating agent, it must fulfill at least two conditions. First, it must possess two appropriate functional groups, the donor atoms which are capable of combining with a metal atom by donating a pair of electrons. These electrons may be contributed by basic coordinating groups such as $NH_2$ or acidic groups that have lost a proton. Second, these functional groups must be so situated in the molecule that they permit the formation of a ring with the metal atom as the closing member. The donor group is termed a ligand and the metal atom the acceptor. Chelates can only be formed by ligands that have more than one point of attachment to the metal. Therefore, a bidentate or polydentate ligand can form a chelate, but an unidentate ligand cannot form a chelate. Thus, for example, an unidentate sulfonic acid salt is not by definition a chelate.

Use of the tanner's "masking agents" by direct addition to a drilling mud is completely impractical. However, to achieve the desired control of polysaccharide cross-linking, avoidance of overtreatment, etc., resort may be made to the use of preformed components which function in the manner of masking agents.

To provide orientation regarding the function of masking agents, as well as that of the organic polyelectrolyte component that was designed to provide controlled cross-linking of polysaccharide material, certain salient characteristics of metal organic chelation chemistry and the properties of such organo metal complexes should be pointed out.

An organo metal entity in which the metal atom is bound to its immediate neighbors by a covalent bond—formed as the result of the metal atom accepting an electron pair from each non-metal atom—is defined as a metal complex.

A special kind of complex in which the electron donor (ligand) is attached to the metal by two or more functional groups—each of which is capable of combining with a metal atom by donating a pair of electrons and in which these groups are so situated in the molecule that they permit the formation of a ring with the metal atom as the closing member—is termed a chelate.

The oxalate ion is a classic example of a bidentate ligand forming a five-membered ring:

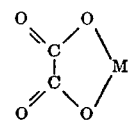

Particularly well studied in the trans-chromium oxalate complex which is an example of a more complicated chelate structure:

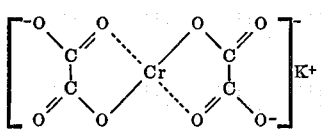

The stabilities of complexes are greatly inreased by the coordination of polydentate ligands. Organic polyelectrolytes, such as lignin-derived polymers having a large number of various ligand groups attached to the backbone of the macromolecule, are capable of forming a wide variety of chelate complexes, the properties of which will be determined by the nature of the macromolecule and the properties of the chelated metal. As previously mentioned, the first series of the transition elements is particularly active in the formation of chelate structures utilized in the present invention.

Of the first series of transition metals, chromium is of special interest. Although thousands of trivalent chromium complexes are recorded, there is no authenticated exception to the rule that trivalent chromium is necessarily hexacoordinate. The coordination bonds of trivalent chromium ion are noted for their unusual strength, and this six-coordinate structure lends itself to the formation of organic chelates, complexes and polynuclear complexes having the probability of enhanced cross-linking depending upon the specific manner of preparing the material.

In general, the formation of a complex ion from its constituents in aqueous solution is reversible and may be represented by $$ML_n + nH_2O \rightleftharpoons M(OH_2)_n + nL$$

where M is the metal and L is the ligand.

The formation of the complex ion must proceed stepwise, and for chromium the reactions may be represented as $$Cr(OH_2)_6 + L \rightleftharpoons Cr(OH_2)_5L + H_2O$$
$$Cr(OH_2)_5 + L \rightleftharpoons Cr(OH_2)_4L_2 + H_2O$$
$$Cr(OH_2L_5 + L \rightleftharpoons CrL_6 + H_2O$$

For each step in the process there is an equilibrium constant defined by the expressions $$K_1 = \frac{[Cr(OH_2)_5L]}{[Cr(OH_2)_6][L]}$$

$$K_2 = \frac{[Cr(OH_2)_4L_2]}{[Cr(OH_2)_5L][L]}$$

$$K_6 = \frac{[CrL_6]}{[Cr(OH_2)L_5][L]}$$

The stability constants K may be considered analogous to dissociation constants and nearly always decrease in the order $K^1 > K^2 > K^3 \ldots K_n$. The product of the successive stability constants $$K_1 \times K_2 \times K_3 \ldots K_n = \frac{[ML_n]}{[M(OH_2)_n][L]^n} = \beta$$

is the overall stability constant of the system and is commonly used as a general guide to the stability of the complex.

The above indicates that the availability of the metal as a reactive ion can vary, depending upon the complex in which this is involved. This is the real meaning of "masking agent."

The reality of this aspect of chelation chemistry is amply borne out in biochemistry. Metals which are essential for plant and animal life depend upon the nature of coordination complexes to influence the vital processes of living organisms. The hemin of blood is an iron chelate, and chlorophyll is a magnesium chelate structure.

The chelation chemistry involved in the preparation of metal ion buffers is fundamental to the action of the organic polyelectrolyte ligand component in providing a controlled cross-linking mechanism for macromolecular polyelectrolytes. It has been pointed out that by selecting a proper complexing agent, a free metal ion concentration can be maintained at a relatively constant level in a predetermined range, just as a constant hydrogen ion concentration is maintained in conventional buffer systems. The term "metal ion buffered cross-linking agent" as used herein and in the claim refers to such a complex of a ligand and a metal ion component.

Lignin-derived polymers may be prepared in which the chelation of chromium is effected to provide the buffered availability of chromium of this invention. By so doing the olation reactions involving the polysaccharide can be controlled and, as a result, the "overtreatment" effect characteristic of chromic and other metal ions can be minimized and resistance to alkaline agents, such as cement, improved. With the buffered release of effective chromium for cross-linking by the organic polyelectrolyte component, the apparent viscosity of the polysaccharide does not show the sharp overtreatment effect and loss of structure that occurs with the addition of chrome alum or chrome chloride.

This metal ion buffering action has been illustrated by titration curves of chrome alum and the organic polyelectrolyte component. The chrome alum is neutralized in a manner that shows that the chromic ion is readily available for reaction with sodium hydroxide, whereas the chromium in the organic polyelectrolyte component is buffered and reacts more slowly and in relation to the amount of sodium hydroxide available. Because of this, it would seem that oxalated structures or chromic hydroxides would not form as readily in the organic polyelectrolyte solution as would be the case in chrome alum solutions. These forms are not desirable because they tend to precipitate the polysaccharide and thereby cause a decrease in apparent viscosity of the solutions.

The desirability of the metal ion buffered metal component in the organic polyelectrolyte over that of chrome alum is particularly pertinent in the case of saline water. The development of rheological structure or apparent viscosity of a polysaccharide in Galveston Bay water by OCP is substantial, whereas chrome alum in this water never develops full cross-linking but over-treats at very low-level additions. The desirability of the organic polyelectrolyte component in these saline waters is obvious and clearly illustrates the chelate buffering action of the organic polyelectrolyte.

The cross-linking effect obtained with the organic polyelectrolyte ligand component can double the apparent viscosity of a given polysaccharide solution and thereby achieve the desired result at less than one-half the cost of using additional polyelectrolyte quantities to achieve the same apparent viscosity increase. Furthermore, the polyelectrolyte component does so in a more controlled and stable manner than chrome alum. The effectiveness of the polyelectrolyte component in increasing rheological structure and apparent viscosity of polysaccharide solutions is illustrated in the attached figures.

To achieve desirable drilling fluid rheology it is necessary that in addition to shear-thinning characteristics the drilling fluid show thixotropic behavior. The thixotropy of the present drilling fluid is illustrated in FIG. 5. After a period of quiescence of only a minute or two, a "gel" structure does develop, as is shown on the "up" curve obtained with a variable shear recording viscometer. On the "down" curve, after exposure to shear of 1,000 sec.$^{-1}$, the thixotropic gel hump is eliminated; but the dynamic bonding attractions are still present in the system, as shown by the pseudoplastic type of curve, especially the relationship appearing at low shear rates. This type of internal friction is particularly desirable to attain good hole cleaning characteristics of drilling fluid under conditions of the annulus. With the greater kinetic energy inputs at high shear rates, these interparticle attractions are overcome, and the internal friction parameters reduce to the bare minimum, typical of aligned, fairly rigid linear polymers in laminar flow.

A cross-linked polysaccharide material performs the primary function of providing a dynamically thixotropic supporting structure for good hole cleaning. It is, however, sometimes required in rig operations that "viscosity" be increased without a simultaneous increase in gel strength. Attempting to accomplish this with a polysaccharide only is frustrating and costly; the polysaccharide tends to build structure, not viscosity, and the usual practice of adding clays to build viscosity is against the principle of the "low solids" system concept.

Organic polyelectrolyte ligands containing reactive groups capable of forming metal chelates may be used as ligands in our drilling fluid composition. For example, lignin-containing materials such as kraft lignin, soda lignin, polyphenolic tannins and polyflavonoids may function as suitable ligands. Lignosulfonates in which the sulfonic groups have been prereacted and saturated with sodium or ammonium ions are especially useful as ligands for the preparation of the drilling fluid of this invention. Lignin-containing materials as used in the practice of this invention are readily available as by-products of chemical processes making chemical wood pulp or wood cellulose which are used to make paper and other products. The three processes generally used to chemically extract the cellulose from the wood, leaving the lignin from the wood in the waste liquor, are the soda process, the sulfate process, and the bisulfite or sulfite process. In general, any type of wood or lignocellulosic material which can be resolved into cellulose pulp by one of these three processes may be used as a source of lignin-containing materials for use in accordance with our discovery.

For reasons of economy, we prefer to utilize a sulfonated lignin-derived polymer which can be prepared by cooking wood chips with a sodium bisulfite or by adding sodium salts to calcium sulfite waste liquor in a manner calculated to cause a precipitation of the calcium ion and thereby forming the sodium salt of lignosulfonic acid. A sulfonate lignin-derived polymer derived from basic calcium lignosulfonate made in accordance with the procedures disclosed in patents, such as United States Reissue Patent Nos. 18,268 and 18,369, may be used. The calcium lignosulfonate is converted to the sodium salt by reaction of the sulfonic groups of the lignosulfonates with stoichiometric equivalent amounts of sodium salts, the anions of which will form water insoluble calcium salts such as sodium phosphate, sodium fluoride, sodium oxalate, and sodium carbonate. Other metallic salts of lignosulfonates may also be used.

Although preferred, it is not essential in the preparation of the drilling fluid of the present invention that sulfonated lignin-containing materials be used, for it has been found that practically any material containing reactive groups capable of forming metal chelates can be used to form the drilling fluid of the present invention.

Moreover, natural tannin-containing polyelectrolytes, such as wattle extract or quebracho, may also be used as the organic polyelectrolyte ligand in the drilling fluid of the present invention. Bark extracts derived by bisulfite cooking of hemlock, redwood, douglas fir, and similar barks may also be used. The teachings of patents, such as United States Patent Nos. 2,890,231 and 2,938,893 or similar known processes, may be used to obtain a satisfactory bark extract as the organic polyelectrolyte ligand component for use in our drilling fluid.

When using a lignosulfonate as the organic polyelectrolyte ligand component, we prefer to utilize a lignosulfonate which is essentially free of wood sugars and hemicellulose. For example, when reacting spent sulfite liquor with materials such as sulfuric acid and sodium sulfate in a water solvent system to provide sodium lignosulfonate, it is desirable to destroy the residual sugar content with ammonia gas, heat, or other additives or processes known to those skilled in the art.

In order to achieve enhanced characteristics when lignin is the selected polyelectrolyte ligand component, it should be polymerized to such a degree that the resulting product in an aqueous solution has a viscosity of about 80 centipoises at 30° C. with 36% by weight solids. Polymerization may be practiced by any suitable effective method known to those skilled in the art. However, we have found that excellent lignin polymer characteristics may be obtained by utilizing formaldehyde condensation polymerization techniques.

Our drilling fluid composition also contains a compound containing a metal from the first series of the transition elements. The transition elements may be defined as those elements which have partly filled $d$ or $f$ shells in any of their commonly occurring oxidation states. The first series transition elements includes scandium, titanium, vanadium, manganese, iron, cobalt, chromium, nickel, and copper.

When chromium has been selected as the metal component from the first series of transition elements, our tests have indicated that not all chromium salts react suitably with the organic polyelecrolyte ligand component. We have found that it is essential that the chromium not be introduced in the organic polyelectrolyte ligand component by an oxidation reaction as by reacting with chromates or dichromates, for this causes the chromium to be covalently bonded in the organic molecule in such a manner as to render the chromium unavailable for base exchange or for cross-linking reactions. We have further found that there are even great differences in, for example, nominal chrome sulfates and that, when using a chrome sulfate, it is imperative that chrome sulfates having specific properties be utilized. We have found, when selecting chrome in the form of chrome sulfate as the transition metal component, that a chrome sulfate compound having properties within the following ranges will be effective in producing the cross-linking agent of the present invention without metal ion overtreatment effects:

| Properties: | Effective range |
|---|---|
| Basicity, degrees Schlorlemmer | 33⅓° to 0° |
| pH, solution | 2.3 or less |
| Total chrome, wt. percent solution basis | 12.5 to 11.8 |
| Total sodium, wt. percent solution basis | 6.0 to 5.0 |
| Total sulfate sulfur, wt. percent solution basis | 16.0 to 15.0 |
| Total solids, wt. percent solution basis | 66 to 60.0 |

We prefer to utilize a chrome sulfate product with the following properties:

| Properties: | Effective range |
|---|---|
| Basicity, degrees Schlorlemmer | 33⅓° |
| pH, solution, equal to or less than | 2.0 |
| Total chrome, wt. percent solution basis | 12.1 |
| Total sodium, wt. percent solution basis | 5.8 |
| Total sulfate sulfur, wt. percent solution basis | 15.2 |
| Total solids, wt. percent solution basis | 65.0 |

Assuming that the chrome sulfate is prepared by the reduction of sodium dichromate by a reducing agent in a sulfuric acid solution, the basicity of the resulting chromium sulfate compound may be determined as follows:

$$1.33 - \frac{\text{wt. } H_2SO_4}{\text{wt. } Na_2Cr_2O_7 \cdot 2H_2O} = 1.33 - \frac{\text{wt. } H_2SO_4}{\text{wt. } K_2Cr_2O_7}$$

When using chrome sulfate in obtaining the cross-linking agent of the present invention, it is imperative that the basicity of the chrome sulfate be one-third or less and that a chrome sulfate having the above-described properties be used. Stating that a "basic" chrome sulfate may be utilized is not definitive enough to determine the particular chrome material that must be used in accordance with the invention.

Although not fully understood, as previously stated, it is believed that the effective cross-linking of the macromolecular polysaccharide material with the organic polyelectrolyte ligand component is obtained due to the ability of certain organic polyelectrolyte ligands to form chelates of controlled stability coefficient with a component containing a metal of the first series of the transition elements of the Periodic Table, such as chromium. For example, chromium chelates make the metal available for the cross-linking of the hydroxyl groups of the macromolecular polysaccharide material in a controlled or "buffered" manner that prevents chromium ion overtreatment effects and minimizes other undesirable side reactions of the chromium ions that may occur through dissociation of ordinary chrome sulfates, chlorides or alums.

We have found that the effectiveness of the cross-linking action of the chelate component with macromolecular polysaccharide materials is enhanced by the addition into the organic polyelectrolyte ligand of a compound containing an element from Group II of the Periodic Table. For example, the incorporation of magnesium into the organic polyelectrolyte ligand component greatly increases the commercial utility of the compound by increasing its effectiveness in a variety of natural waters. When selecting magnesium, we have found that about 3.5% by weight, dry solids basis, to the entire composition, is a sufficient amount under normal circumstances to produce effective cross-linking. We have also found that this material may be effectively introduced in the reaction process as magnesium chloride. When utilizing magnesium chloride we prefer to add about 13.72% by weight on an anhydrous basis based on the weight of the entire buffered cross-linking agent.

When reacting chrome sulfate as above described with the organic polyelectrolyte ligand component, we prefer to use about 5.7% chromium by weight of the entire cross-linking agent composition, although the chromium content may be as low as 4.0% and as high as 10.0%. The chrome sulfate is added to the solution in a reaction vessel, and agitation is initiated and continued for at least 30 minutes in order to assure complete reaction. The resulting material may be utilized in liquid, or spray dried and used in powder form.

The actual cross-linking of the macromolecular polysaccharide component with the organic polyelectrolyte ligand component may be effected in one of several ways which will provide a drilling fluid with enhanced rheological characteristics. For example, the macromolecular polysaccharide component and the organic polyelectrolyte component may be added simultaneously to the water circulating in the well. Preferably, the macromolecular polysaccharide component is dispersed and circulated in the water solution, followed by the addition of the organic polyelectrolyte component. Cross-linking of the macromolecular polysaccharide component may also take place in a convenient mixing tank adjacent to the well site.

The amount of the organic polyelectrolyte ligand component which may be utilized with the macromolecular polysaccharide component is not critical and will vary, depending upon the particular application at hand. Any amount sufficient to produce cross-linking of the polysaccharide may be added. We have found that metal ion overtreatment characteristics will not result when using the metal ion buffered cross-linking agent in agent-to-polysaccharide ratios as low as about 1-to-1 and as high as about 24-to-1. Generally speaking, a 4-to-1 buffered cross-linking agent-to-polysaccharide ratio should be sufficient to produce the desired controlled rheological properties. It is important to note that these solutions are distinct due to the fact that no bentonite or similar agent is added or desired for the system to function effectively.

After the addition of the cross-linking agent, the pH of the solution should be adjusted to a range between about 6 and about 7 with sodium hydroxide or a similar chemical. We have found that a pH adjustment to about 7 is quite satisfactory. The solution should be mechanically stirred in order to prevent a localized high pH condition. After initial mixing, the pH of the aqueous solution may be adjusted up to about 11.0.

In order to prevent biodegradation, a common occurrence in macromolecular polysaccharide materials, a biocide or biodegradation preventative, such as "Dowicide G" manufactured by The Dow Chemical Company, should be added shortly after initial pH adjustment. Other known additives, such as paraformaldehyde, may also be used. We prefer to add about 0.1 p.p.b. to 0.5 p.p.b. of this chemical dissolved in water to the cross-linked polysaccharide solution.

The invention is further described and illustrated by the examples that follow. The chrome alum utilized throughout the examples and in the figures has the formula

$$Cr_2(SO_4)3K_2SO_4 \cdot 24H_2O$$

This material is available as Baker and Adamson chromium potassium sulfate and is manufactured by Allied Chemical Company, General Chemical Division, Morristown, N.J. This material is readily available to the general public.

The macromolecular polysaccharide component, also referred to as simply "polysaccharide," utilized in the examples and figures, is the product of the fermentation reaction of the bacteria *Xanthomonas campestris* on carbohydrates. This material is commercially available as "Kelzan XC Polymer," made by Kelco Company of San Diego, Calif.

EXAMPLE I

The present example demonstrates a preferred process for obtaining the organic polyelectrolyte ligand component of the present drilling fluid composition. Thirteen thousand five hundred (13,500) kg. of sodium lignosulfonate liquor of about 38% solids having present no more than about 7% sugar content is pumped to a drum reactor. The pH of the sodium lignosulfonate liquor is adjusted by pumping 25% ammonium hydroxide to the reactor. Three hundred (300) kg. of this chemical is added below the surface of the sodium lignosulfonate liquor to obtain a pH of about 7.5 and to adequately destroy the sugar content of sodium lignosulfonate. After pH adjustment, the temperature of the reactor is raised to about 130° C. This process is continued for about 120 minutes.

Polymerization is initiated by injecting a solution of 2% formaldehyde in the circulation line while circulating the liquor. Upon the conclusion of formaldehyde injection, the temperature of the reaction mixture is maintained at 130° C. for an additional 45 minutes. The reactants are then cooled down to 70–80° C.

A 33% solution of magnesium chloride (340 liters) is slowly added to five hundred fifty-one (551) kg. of the desugared and polymerized sodium lignosulfonate solution. Two hundred seventy (270) liters of the preferred chrome sulfate solution is slowly injected into the liquor circulation line. After the complete addition of the preferred chrome sulfate with the lignosulfonate, the mixture is agitated for about 30 minutes to insure complete reaction. The agent is then spray dried.

EXAMPLE II

The present example demonstrates the ability of the metal ion buffered cross-linking agent of the present invention to effectively cross-link macromolecular polysaccharide components of our drilling fluid.

A sample of a solution of the polyelectrolyte prepared as in Example I was cross-linked with a macromolecular polysaccharide solution and was compared with an untreated sample of the macromolecular polysaccharide solution. The polyelectrolyte was utilized with the macromolecular polysaccharide in a ratio of 12 lb./bbl. of polyelectrolyte to one lb./bbl. macromolecular polysaccharide. The untreated sample containing only the macromolecular polysaccharide was prepared at the one lb./bbl. level. The water utilized was treated to simulate natural water in that all samples were contaminated with 100 p.p.m. calcium ion. The pH was then adjusted to 8.5 with sodium hydroxide after cross-linking. Viscosity data was determined at room temperature by utilizing a Model 35 Fann Viscometer, a common instrument for measuring rheological properties of liquids, widely accepted by many industries where rheological data is relevant. Fann viscometers are of the concentric cylinder type where the test fluid is contained in an annular space between cylinders. Rotation of the outer cylinder at known velocities is accomplished through precision gearing, causing a torque to be transmitted to the inner cylinder by the viscous drag of the fluid. This torque is balanced by a helical spring, and angular deflection is read from a dial or through suitable sensors on a meter or recorder. The amount of torque at a given r.p.m. is indicated in arbitrary degrees Fann, which may be converted into viscosity or apparent viscosity by appropriate calculation. The apparent viscosity of non-Newtonian fluids or viscosity of Newtonian fluids may be obtained from the Fann reading as follows:

Approximate apparent viscosity of:

(1) Degrees Fann at 600 r.p.m.×½=viscosity in centipoises (2) Degrees Fann at 300 r.p.m.×1=viscosity in centipoises
(3) Degrees Fann at 200 r.p.m.×1½=viscosity in centipoises
(4) Degrees Fann at 100 r.p.m.×3=viscosity in centipoises
(5) Degrees Fann at 6 r.p.m.×39=viscosity in centipoises
(6) Degrees Fann at 3 r.p.m.×98=viscosity in centipoises The results of these tests, shown in FIG. 1, indicated that the metal ion buffered cross-linking agent utilized in our drilling fluid effectively cross-linked with the macromolecular polysaccharide solution to produce a shear rate thinning drilling fluid. The table below further indicates the results of these tests.

TABLE 2

| | Untreated polysaccharide material [1] | | Cross-linking agent [1] | |
|---|---|---|---|---|
| | °Fann | Apparent viscosity (cps.) | °Fann | Apparent viscosity (cps.) |
| R.P.M.: | | | | |
| 600 | 15.0 | | 39.0 | 19.5 |
| 300 | 11.0 | | 27.0 | 27.0 |
| 200 | 10.0 | 15.0 | 21.0 | 31.5 |
| 100 | 8.0 | 24.0 | 16.0 | 48.0 |
| 6 | 3.0 | 147.0 | 8.0 | 392.0 |
| 3 | 3.0 | 294.0 | 7.0 | 616.0 |
| Initial gel, lb./100 sq. ft. | 3.0 | | 11.0 | |
| pH | 9.5 | | 8.8 | |
| NaOH used to adjust pH, cc. | 0.1 | | 4.8 | |

[1] All tests determined at room temperature.

EXAMPLE III

Figure 2:
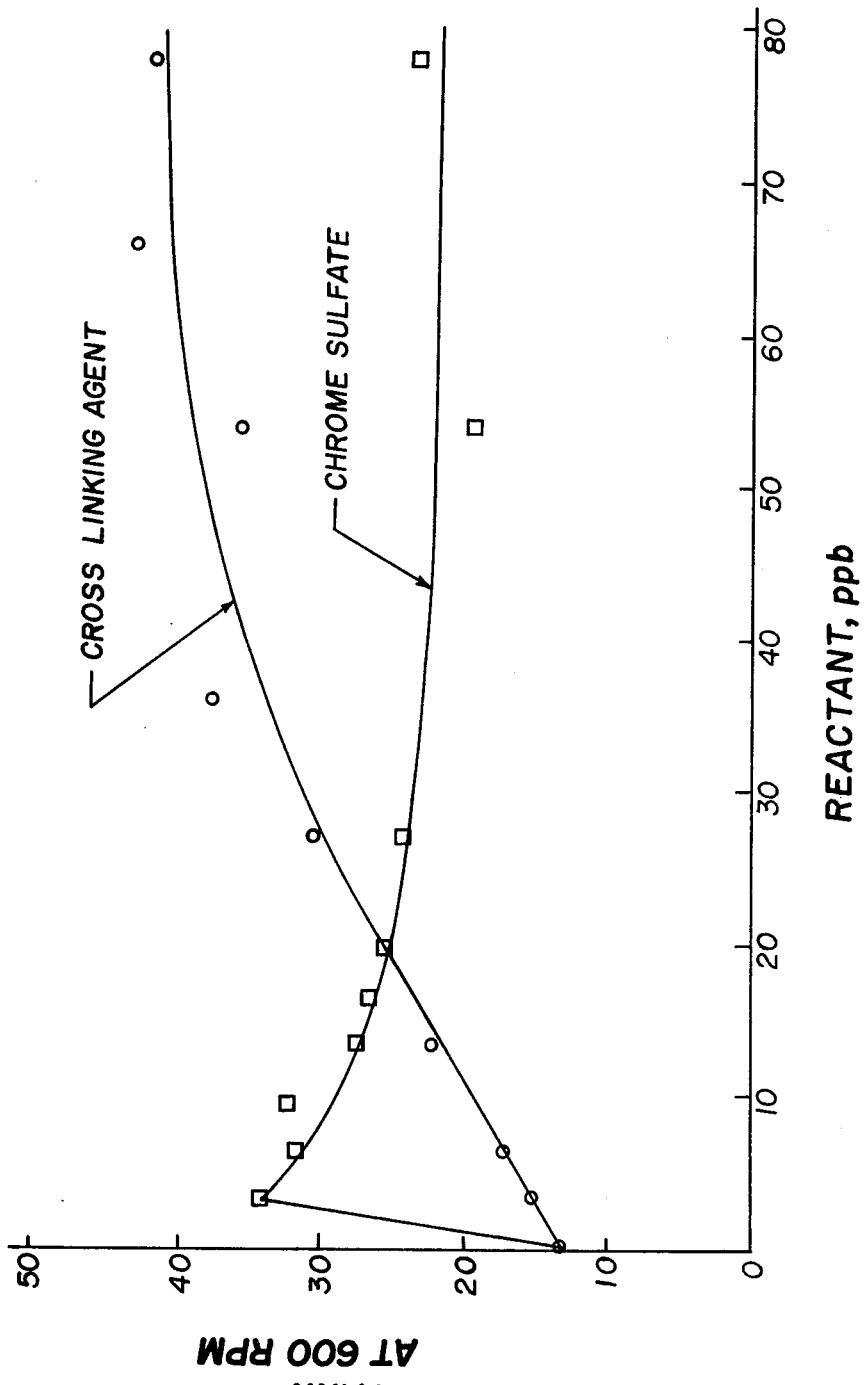
FIG. 2 is a graphical illustration comparing room temperature viscosities of a solution of the drilling fluid of the present invention and a macromolecular polysaccharide material cross-linked with a one-third basicity chrome sulfate material.

Tests were run in order to compare results of cross-linking macromolecular polysaccharide materials with a chrome sulfate having above-described properties with and without the metal ion buffered cross-linking agent of the present drilling fluid, respectively. Gypsum was added to ordinary Houston, Texas, tap water to obtain the equivalent of 100 p.p.m. calcium ion content. One p.p.b. equivalent of the macromolecular polysaccharide material was added to 350 ml. of the water and blended by mechanical agitation. The chrome sulfate and the polyelectrolyte utilized in the present invention made as in Example I were then added to the respective samples. Various p.p.b. levels of these materials were utilized. The pH of the solutions was adjusted to 8.5 with sodium hydroxide in order to obtain maximum cross-linking. The samples were allowed to age overnight before rheological data were obtained, using the Fann Viscometer as previously described. FIG. 2 graphically depicts the results of this test.

As can be seen in the table below, the metal ion buffered cross-linking agent utilized in our drilling fluid provided a more stable thickening agent with increased thickening characteristics as increased p.p.b. levels of the material were utilized. It will also be seen that the problem of overtreatment has been drastically reduced through the use of the metal ion buffered cross-linking agent of our drilling fluid.

TABLE 3-A

| | Chrome sulfate, p.p.b. | | | | | | | | | | | | | | |
|---|---|---|---|---|---|---|---|---|---|---|---|---|---|---|---|
| | 0.28 | | 0.56 | | 0.84 | | 1.12 | | 1.41 | | 1.69 | | 2.43 | | |
| | °Fann | Apparent viscosity | °Fann | Apparent viscosity | °Fann | Apparent viscosity | °Fann | Apparent viscosity | °Fann | Apparent viscosity | °Fann | Apparent viscosity | °Fann | Apparent viscosity | |
| R.P.M.: | | | | | | | | | | | | | | | |
| 600 | 34 | 17.0 | 31 | 15.5 | 32 | 16.0 | 27 | 13.5 | 26 | 13.0 | 25 | 12.5 | 24 | 12.0 | |
| 300 | 23 | 23.0 | 22 | 22.0 | 18 | 18.0 | 17 | 17.0 | 19 | 19.0 | 16 | 16.0 | 17 | 17.0 | |
| 200 | 19 | 28.5 | 16 | 24.0 | 14 | 21.0 | 13 | 19.5 | 12 | 18.0 | 13 | 19.5 | 13 | 19.5 | |
| 100 | 14 | 52.0 | 12 | 36.0 | 10 | 30.0 | 8 | 24.0 | 7 | 21.0 | 9 | 27.0 | 9 | 27.0 | |
| 6 | 5 | 245.0 | 5 | 245.0 | 8 | 292.0 | 4 | 196.0 | 3 | 147.0 | 3 | 147.0 | 2.5 | 122.5 | |
| 3 | 5 | 490.0 | 5 | 490.0 | 8 | 784.0 | 4 | 293.0 | 3 | 294.0 | 3 | 294.0 | 2 | 196.0 | |
| Initial gel, lb./100 sq. ft. | 5 | | 5 | | 12 | | 14 | | 4 | | 4 | | 2 | | |
| pH | 11.4 | | 8.5 | | 8.4 | | 8.5 | | 8.6 | | 8.8 | | 8.8 | | |
| Amount sodium hydroxide added to adjust pH, cc. | 1.0 | | 0.45 | | 0.65 | | 1.0 | | 1.5 | | 1.3 | | 2.0 | | |

TABLE 3-B

| | Cross-linking agent, p.p.b. | | | | | | | | | | | | | | | | |
|---|---|---|---|---|---|---|---|---|---|---|---|---|---|---|---|---|---|
| | 0.73 | | 1.46 | | 2.92 | | 4.37 | | 6.00 | | 8.00 | | 12.00 | |
| | °Fann | Apparent viscosity | °Fann | Apparent viscosity | °Fann | Apparent viscosity | °Fann | Apparent viscosity | °Fann | Apparent viscosity | °Fann | Apparent viscosity | °Fann | Apparent viscosity |
| R.p.m.: | | | | | | | | | | | | | | |
| 600 | 15 | 7.5 | 17 | 8.5 | 22 | 11 | 18 | 9 | 30 | 15 | 37 | 18.5 | 35 | 17.5 |
| 300 | 12 | 12 | 13 | 13 | 17 | 17 | 13 | 13 | 27 | 27 | 27 | 27 | 25 | 25 |
| 200 | 9 | 13.5 | 11 | 16.5 | 14 | 21 | 11 | 16.5 | 17 | 25.5 | 23 | 34.5 | 21 | 31.5 |
| 100 | 7 | 21 | 9 | 27 | 12 | 36 | 9 | 27 | 15 | 25 | 18 | 54 | 17 | 51 |
| 6 | 3 | 147 | 4 | 106 | 5 | 245 | 3.5 | 171.5 | 8 | 392 | 9 | 441 | 9 | 441 |
| 3 | 2 | 196 | 3 | 294 | 4 | 392 | 3 | 294 | 8 | 784 | 8 | 784 | 7 | 686 |
| Initial gel, lb/100 sq. ft. | 3 | | 3 | | 5 | | 4 | | 10 | | 13 | | 13 | |
| pH | 8.6 | | 8.5 | | 8.6 | | 8.9 | | 8.6 | | 8.6 | | 8.7 | |
| Amount sodium hydroxide added to adjust pH, cc. | 0.25 | | 0.60 | | 1.0 | | 1.8 | | 2.5 | | 2.6 | | 3.8 | |

EXAMPLE IV

Figure 3:
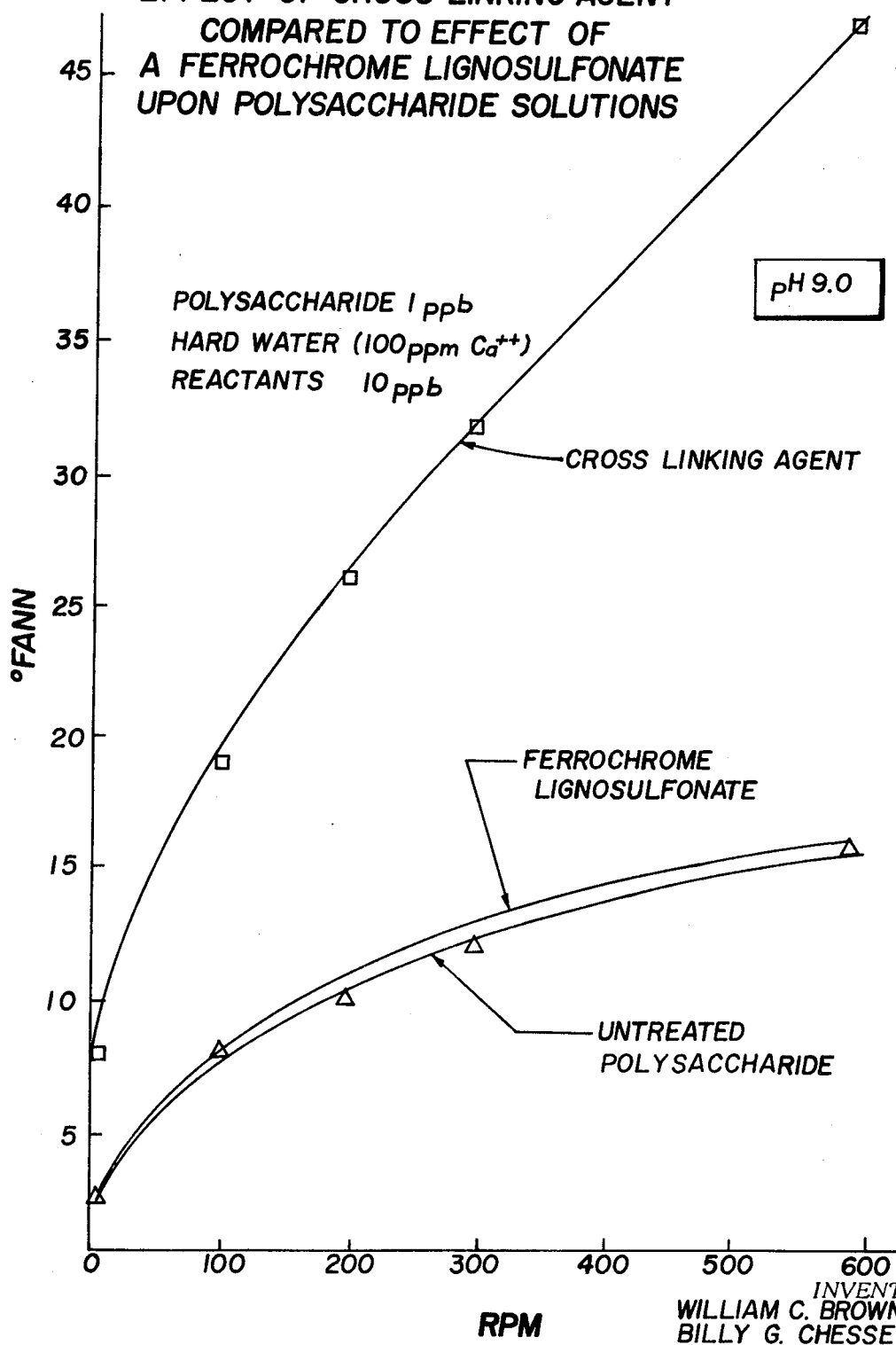
FIG. 3 is a rheogram comparing the room temperature viscosities of a 1 p.p.b. solution of the drilling fluid of the present invention and a macromolecular polysaccharide material cross-linked with a ferrochrome lignosulfonate compound, respectively.

Cross-linking effects of a ferrochrome lignosulfonate material were compared with those of the metal ion buffered cross-linking agent utilized in the present invention as made in Example I. The ferrochrome lignosulfonate material is commercially available as the "Spersene" brand of this material manufactured by Dresser Industries and patented under United States Patent No. 2,935,473. One p.p.b. of the polysaccharide material was utilized in each test sample. Three hundred and fifty (350) ml. of hard water containing 100 p.p.m. calcium ion was utilized. The macromolecular polysaccharide material was added to each water sample and blended by mechanical agitation. Into one sample was placed 10 p.p.b. of the metal ion buffered cross-linking agent as utilized in the present invention. Into the remaining sample was placed 10 p.p.b. "Spersene." The pH of each sample was adjusted to 9.0 by addition of sufficient quantities of sodium hydroxide. Fann readings were taken at 25° C. FIG. 3 shows the results of these tests. As can be readily seen, there was a considerable enhancement of thixotropy by utilization of the metal ion buffered cross-linking agent of the present invention. The tables below further illustrate the results of these tests. It should be emphasized that for economic reasons it is highly desirable to obtain the highest apparent viscosity possible by a given amount of shear rate thinning properties.

TABLE 4-A.—CROSS-LINKING AGENT

| | Revolution per minute | | | | | |
|---|---|---|---|---|---|---|
| | 0 | 100 | 200 | 300 | 600 |
| °Fann | 7.6 | 18 | 27 | 34 | 49 |
| Apparent viscosity, centipoises | | 54 | 40.5 | 34 | 24.5 |

TABLE 4-B.—"SPERSENE"

| | Revolution per minute | | | | | |
|---|---|---|---|---|---|---|
| | 0 | 100 | 200 | 300 | 600 |
| °Fann | 2 | 7.5 | 11 | 13 | 16 |
| Apparent viscosity, centipoises | | 22.5 | 16.5 | 13 | 8 |

EXAMPLE V

Tests were run and results were evaluated in order to determine the ability of the metal ion buffered cross-linking agent utilized in the present drilling fluid to prevent chromium ion overtreatment of macromolecular polysaccharide materials. The tests were conducted in hard water contaminated with 100 p.p.m. calcium ion. One p.p.b. of the polysaccharide material was utilized with p.p.b. levels from 0 to 10 of a basic chrome-containing, cross-linking compound, chrome alum, and the metal ion buffered cross-linking agent utilized in the present invention and made according to Example I, respectively. The pH of the solutions was raised with sodium hydroxide to 9.0. The Fann Viscometer, as described above, was again utilized to obtain rheological data. The Fann readings were taken at the 600 r.p.m. level at room temperature. FIG. 4 illustrates the results of this test. As can be seen, the metal ion buffered cross-linking agent utilized in the present drilling fluid produced a thinning of the polysaccharide material after a peak in thickening at the 1 p.p.b. level. This characteristic is called "overtreatment" and, as can also be seen, was completely eliminated by the use of the metal ion cross-linking agent as utilized in the present invention. The results of this test are described in detail in the following table.

TABLE 5.—CROSS-LINKING AGENT

| P.p.b. | °Fann at 600 r.p.m. |
|---|---|
| 0 | 15 |
| 1 | 30 |
| 2 | 34 |
| 4 | 35 |
| 6 | 40 |
| 8 | 40 |
| 10 | 47 |

CHROME ALUM

| P.p.b. | °Fann at 600 r.p.m. |
|---|---|
| 0 | 15 |
| 1 | 46 |
| 2 | 19 |
| 4 | 11 |
| 6 | 9 |
| 8 | 9 |
| 10 | 9 |

EXAMPLE VI

Tests were run and results were evaluated to determine cross-linking characteristics of the metal ion buffered cross-linking agent made as in Example I, compared with those of a chromium-containing compound commercially available as chrome alum. The tests were in Galveston Bay water in order to simulate a difficult environment in which to cross-link macromolecular polysaccharide material. An analysis of the Galveston Bay water indicated the following contents:

| | Mg./ml. |
|---|---|
| Calcium content | 0.170 |
| Magnesium content | 0.460 |
| Sodium content | 3.8 |

| | Mg./ml. |
|---|---|
| Sulfate content | 9.83 |
| Chloride content | 6.8 |
| Specific gravity | 1.009 |
| pH | 7.4 |

The test samples were prepared by adding to 350 ml. samples of the water one p.p.b. equivalent of the macromolecular polysaccharide material. Blending was achieved by mechanical agitation. The samples were then treated with 0, 1, 2, 4, 6, 8 and 10 p.p.b., respectively, of the metal ion buffered cross-linking agent utilized in the present invention, made as in Example I. Other samples of the marcomolecular polysaccharide material were treated with chrome alum at 0.10, 0.25, 0.50, 1.50, 3.00, 6.00, and 10.00 p.p.b. levels, respectively, and also blended by mechanical agitation. The pH of all samples was then raised to 9.0 with sodium hydroxide. All samples were allowed to cool to room temperature before Fann readings were initiated.

Table 6–A below contains the results of tests using the chrome alum compound, while Table 6–B below illustrates the results obtained with the cross-linking agent of the present invention. It is of special interest to note that chrome alum gave poor results at all concentrations evaluated. Maximum cross-linking was obtained with 0.10 p.p.b. of the chrome alum sample.

TABLE 6-A

| | \multicolumn{16}{c|}{Chrome alum, p.p.b.} | | | | | | | | | | | | | | | |
|---|---|---|---|---|---|---|---|---|---|---|---|---|---|---|---|---|
| | 0.00 | | 0.10 | | 0.25 | | 0.50 | | 1.50 | | 3.00 | | 6.00 | | 10.00 | |
| | °Fann | Apparent viscosity | °Fann | Apparent viscosity | °Fann | Apparent viscosity | °Fann | Apparent viscosity | °Fann | Apparent viscosity | °Fann | Apparent viscosity | °Fann | Apparent viscosity | °Fann | Apparent viscosity |
| R.p.m.: | | | | | | | | | | | | | | | | |
| 600 | 49 | 24.5 | 28 | 14 | 12 | 6 | 11.5 | 5.75 | 8 | 4 | 8 | 4 | 7 | 3.5 | 7 | 3.5 |
| 300 | 35 | 35 | 18 | 18 | 7 | 7 | 7 | 7 | 5 | 4.5 | 5 | 4.5 | 4 | 4 | 4 | 4 |
| 200 | 29 | 43.5 | 15 | 22.5 | 5 | 7.5 | 5 | 7.5 | 3 | 4.5 | 3 | 4.5 | 3 | 4.5 | 3 | 4.5 |
| 100 | 22 | 66 | 10 | 30 | 4 | 12 | 3 | 9 | 2 | 6 | 2 | 6 | 2 | 6 | 2 | 6 |
| 6 | 9 | 441 | 4 | 196 | 1 | 49 | 1 | 49 | 0 | 0 | 0 | 0 | 0 | 0 | 0 | 0 |
| 3 | 8 | 784 | 3 | 294 | 1 | 98 | 1 | 98 | 0 | 0 | 0 | 0 | 0 | 0 | 0 | 0 |
| Initial gel, lb./100 sq. ft. | 12 | | 6 | | 2 | | 2 | | 2 | | 2 | | 1 | | 1 | |
| pH | 9.2 | | 9.2 | | 9.0 | | 9.0 | | 9.0 | | 9.0 | | 9.0 | | 9.0 | |

TABLE 6-B

| | \multicolumn{14}{c|}{Cross-linking agent of the present invention, p.p.b.} | | | | | | | | | | | | | |
|---|---|---|---|---|---|---|---|---|---|---|---|---|---|---|
| | 0.0 | | 1.0 | | 2.0 | | 4.0 | | 6.0 | | 8.0 | | 10.0 | |
| | °Fann | Apparent viscosity | °Fann | Apparent viscosity | °Fann | Apparent viscosity | °Fann | Apparent viscosity | °Fann | Apparent viscosity | °Fann | Apparent viscosity | °Fann | Apparent viscosity |
| R.p.m.: | | | | | | | | | | | | | | |
| 600 | 49 | 24.5 | 52 | 26 | 50 | 25 | 50 | 25 | 55 | 27.5 | 55 | 27.5 | 57 | 28.5 |
| 300 | 35 | 35 | 38 | 38 | 35 | 35 | 35 | 35 | 40 | 40 | 40 | 40 | 42 | 42 |
| 200 | 29 | 43.5 | 31 | 46.5 | 30 | 45 | 30 | 45 | 35 | 52.5 | 35 | 52.5 | 35 | 52.5 |
| 100 | 22 | 66 | 23 | 69 | 22 | 66 | 21 | 63 | 25 | 75 | 25 | 75 | 25 | 75 |
| 6 | 9 | 441 | 9 | 392 | 8 | 392 | 8 | 392 | 11 | 539 | 10 | 539 | 12 | 588 |
| 3 | 8 | 784 | 7 | 686 | 7 | 686 | 7 | 686 | 10 | 980 | 9 | 882 | 11 | 1078 |
| Initial gel, lb./100 sq. ft. | 12 | | 12 | | 12 | | 11 | | 13 | | 10 | | 15 | |
| pH | 9.2 | | 9.0 | | 9.0 | | 9.0 | | 9.0 | | 9.0 | | 9.0 | |

EXAMPLE VII

Tests were run, as in Example VI above, except that a brine system replaced the Galveston Bay seawater. Brines are often encountered in the actual drilling of oil and gas wells and are a difficult environment in which to cross-link a macromolecular polysaccharide material and to control drilling fluid rheology.

The synthetic brine samples were prepared by dissolving 82 grams of $CaCl_2 \cdot 2H_2O$ in 350 ml. of deionized water. Reagent-grade calcium chloride was utilized. Samples, as made in Example VI above, were again prepared and evaluated. Tables 7-A and 7-B illustrate the results of this test. It should be noted that only at the 0.10 p.p.b. concentration did chrome alum obtain a satisfactory cross-linking effect.

EXAMPLE VIII

Additional tests were conducted and results evaluated to determine the elimination of the metal ion overtreatment factor so often occurring when utilizing prior and less effective cross-linking agents for macromolecular polysaccharide materials. It was found that ratios of the cross-linking agent to macromolecular polysaccharide material as high as 24-to-1 still provided thickening characteristics and showed no indication of chromium ion overtreatment effects. The tests were conducted in both calcium-contaminated Houston, Texas, tap water, i.e., hard water, and synthetic seawater. The hard water was prepared for the samples by placing 100 p.p.m. calcium as calcium sulfate in 350 ml. of deionized water. The synthetic seawater was prepared by adding to 350 ml. deionized water 400 p.p.m. calcium as calcium sulfate and 30,000 p.p.m. chloride as sodium chloride.

Samples containing 100 p.p.m. hard water and synthetic seawater, respectively, were treated with 0.50 and 0.75 p.p.b. of the macromolecular polysaccharide material and were then blended by mechanical agitation. The samples were then treated with 2, 6, and 12 p.p.b., respectively, of the metal ion buffered cross-linking agent made as in Example I, and were again mechanically agitated. The pH of each sample was adjusted to 9.0. The samples were cooled to room temperature before determining rheological properties using the Fann Viscometer as described earlier. Fann Viscometer tests taken at room temperature were also conducted on portions of the samples after "aging" for 16 hours at 150° F., in order to determine the effect of higher temperatures on rheological properties. All tests resulted in no chromium ion overtreatment characteristics. Each sample showed thickening at increased p.p.b. levels. In addition, excellent shear-thinning properties were also obtained. Increased temperatures did not affect shear-thinning characteristics.

TABLE 7-A

| | \multicolumn{12}{c}{Chrome alum, p.p.b.} | | | | | | | | | | | |
|---|---|---|---|---|---|---|---|---|---|---|---|---|
| | 0.00 | | 0.10 | | 0.25 | | 0.50 | | 1.50 | | 10.00 | |
| R.p.m.: | °Fann | Apparent viscosity | °Fann | Apparent viscosity | °Fann | Apparent viscosity | °Fann | Apparent viscosity | °Fann | Apparent viscosity | °Fann | Apparent viscosity |
| 600 | 18.5 | 9.25 | 33 | 46.5 | 37 | 18.5 | 17 | 8.5 | 13 | 6.5 | 14 | 7 |
| 300 | 13.5 | 13.5 | 23 | 23 | 25 | 25 | 10 | 10 | 8 | 8 | 9 | 9 |
| 200 | 11.5 | 17.5 | 18 | 27 | 20 | 30 | 7 | 10.5 | 5 | 7.5 | 7 | 10.5 |
| 100 | 8 | 24 | 14 | 42 | 14 | 42 | 5 | 15 | 3 | 9 | 5 | 15 |
| 6 | 2 | 98 | 5 | 245 | 5 | 245 | 1 | 49 | 0 | 0 | 1 | 49 |
| 3 | 1.5 | 1.47 | 5.0 | 4.90 | 4 | 392 | 0 | 0 | 0 | 0 | 1 | 98 |
| Initial gel, lb./100 sq. ft. | 3 | | 14 | | 10 | | 1 | | 0.5 | | 3 | |
| pH | 9.0 | | 8.3 | | 8.3 | | 8.3 | | 8.3 | | 8.3 | |

TABLE 7-B

| | \multicolumn{12}{c}{Cross-linking agent of the present invention, p.p.b.} | | | | | | | | | | | |
|---|---|---|---|---|---|---|---|---|---|---|---|---|
| | 0 | | 1 | | 2 | | 4 | | 6 | | 8 | | 10 | |
| R.p.m.: | °Fann | Apparent viscosity | °Fann | Apparent viscosity | °Fann | Apparent viscosity | °Fann | Apparent viscosity | °Fann | Apparent viscosity | °Fann | Apparent viscosity | °Fann | Apparent viscosity |
| 600 | 18.5 | 9.25 | 33 | 16.2 | 48 | 24 | 47 | 23.5 | 34 | 17 | 57 | 28.5 | 60 | 30 |
| 300 | 13.5 | 13.5 | 22 | 22 | 33 | 33 | 32 | 32 | 23 | 23 | 37 | 37 | 40 | 40 |
| 200 | 11.5 | 17.25 | 18 | 27 | 26 | 39 | 25 | 37.5 | 16 | 24 | 29 | 43.5 | 30 | 45 |
| 100 | 8 | 24 | 12 | 36 | 18 | 54 | 17 | 51 | 8 | 24 | 18 | 54 | 19 | 57 |
| 6 | 2 | 98 | 3 | 147 | 5.5 | 269.5 | 4 | 196 | 2.5 | 122.5 | 4 | 196 | 5 | 245 |
| 3 | 1.5 | 147 | 2 | 196 | 5 | 490 | 3 | 294 | 2 | 196 | 3 | 294 | 9 | 441 |
| Initial gel, lb./100 sq. ft. | 3 | | 3 | | 11 | | 8 | | 5 | | 5 | | 8 | |
| pH | 9.0 | | 8.5 | | 8.4 | | 8.2 | | 8.2 | | 8.3 | | 8.3 | |

TABLE 8-A.—TESTS IN HARD WATER BEFORE AGING

| | Polysaccharide material, p.p.b. | | | | | | | | | | | |
|---|---|---|---|---|---|---|---|---|---|---|---|---|
| | 0.50 | | 0.50 | | 0.50 | | 0.75 | | 0.75 | | 0.75 | |
| | Cross-linking agent, p.p.b. | | | | | | | | | | | |
| | 2 | | 6 | | 12 | | 2 | | 6 | | 12 | |
| | °Fann | Apparent viscosity | °Fann | Apparent viscosity | °Fann | Apparent viscosity | °Fann | Apparent viscosity | °Fann | Apparent viscosity | °Fann | Apparent viscosity |
| R.p.m.: | | | | | | | | | | | | |
| 600 | 18 | 9 | 19 | 9.5 | 30 | 15 | 29 | 14.5 | 31.5 | 15.5 | 36 | 18 |
| 300 | 12 | 12 | 13 | 13 | 20 | 20 | 20 | 20 | 22 | 22 | 25 | 25 |
| 200 | 10 | 15 | 11 | 16.5 | 17 | 25.5 | 17 | 25.5 | 18 | 27 | 21 | 31.5 |
| 100 | 7 | 21 | 8 | 24 | 12 | 36 | 13 | 39 | 14 | 42 | 16 | 48 |
| 6 | 3 | 147 | 4 | 196 | 5 | 245 | 6 | 294 | 6 | 294 | 21 | 1,029 |
| 3 | 2.5 | 245 | 3 | 294 | 4 | 392 | 6 | 588 | 5 | 490 | 16 | 1,568 |
| Initial gel, lb./100 sq. ft. | 9 | | 8 | | 8 | | 12 | | 10 | | 12 | |
| pH | 9.0 | | 9.0 | | 9.0 | | 9.0 | | 9.0 | | 9.0 | |

TABLE 8-B.—TESTS IN HARD WATER AFTER AGING

| | Polysaccharide material, p.p.b. | | | | | | | | | | | |
|---|---|---|---|---|---|---|---|---|---|---|---|---|
| | 0.50 | | 0.50 | | 0.50 | | 0.75 | | 0.75 | | 0.75 | |
| | Cross-linking agent, p.p.b. | | | | | | | | | | | |
| | 2 | | 6 | | 12 | | 2 | | 6 | | 12 | |
| | °Fann | Apparent viscosity | °Fann | Apparent viscosity | °Fann | Apparent viscosity | °Fann | Apparent viscosity | °Fann | Apparent viscosity | °Fann | Apparent viscosity |
| R.p.m: | | | | | | | | | | | | |
| 600 | 14 | 7 | 21 | 10.5 | 29 | 14.5 | 25.5 | 12.75 | 31 | 15.5 | 40 | 20 |
| 300 | 9.5 | 9.5 | 14.5 | 14.5 | 17 | 17 | 18 | 18 | 21 | 21 | 28 | 28 |
| 200 | 7.5 | 11.25 | 12 | 18 | 14 | 21 | 15 | 22.5 | 17 | 25.5 | 22.5 | 33.75 |
| 100 | 5 | 15 | 8 | 24 | 9.5 | 28.5 | 10.5 | 31.5 | 11.5 | 34.5 | 16 | 48 |
| 6 | 1 | 49 | 2.5 | 122.5 | 3 | 147 | 3.5 | 171.5 | 3.5 | 171.5 | 6.5 | 318.5 |
| 3 | 1 | 98 | 2 | 196 | 2.5 | 245 | 2.5 | 248 | 3 | 204 | 5 | 490 |
| Initial gel, lb./100 sq. ft. | 1.5 | | 3 | | 3.5 | | 4 | | 4 | | 6 | |
| pH | 7.8 | | 8.0 | | 8.1 | | 7.8 | | 8.0 | | 8.0 | |

TABLE 8-C.—TESTS IN SYNTHETIC SEAWATER BEFORE AGING

| | Polysaccharide material, p.p.b. | | | | | | | | | | | |
|---|---|---|---|---|---|---|---|---|---|---|---|---|
| | 0.50 | | 0.50 | | 0.50 | | 0.75 | | 0.75 | | 0.75 | |
| | Cross-linking agent, p.p.b. | | | | | | | | | | | |
| | 2 | | 6 | | 12 | | 2 | | 6 | | 12 | |
| | °Fann | Apparent viscosity | °Fann | Apparent viscosity | °Fann | Apparent viscosity | °Fann | Apparent viscosity | °Fann | Apparent viscosity | °Fann | Apparent viscosity |
| R.p.m.: | | | | | | | | | | | | |
| 600 | 19 | 9.5 | 16 | 8 | 21 | 10.5 | 24.5 | 12.25 | 30.5 | 15.25 | 35 | 17.5 |
| 300 | 13 | 13 | 11 | 11 | 13.5 | 13.5 | 17 | 17 | 20 | 20 | 24 | 24 |
| 200 | 11 | 16.5 | 8.5 | 12.5 | 11 | 16.5 | 14 | 21 | 15.5 | 23.25 | 19 | 28.5 |
| 100 | 8 | 24 | 6 | 18 | 8 | 24 | 10.5 | 31.5 | 11.5 | 34.5 | 14 | 42 |
| 6 | 3 | 147 | 2 | 98 | 3 | 147 | 4.5 | 220.5 | 5 | 220.5 | 6 | 294 |
| 3 | 2.5 | 245 | 1.5 | 73.5 | 2.5 | 245 | 4 | 392 | 4.5 | 882 | 5 | 490 |
| Initial gel, lb./100 sq. ft. | 5 | | 4 | | 3 | | 8 | | 9 | | 7 | |
| pH | 9.1 | | 9.1 | | 9.0 | | 9.0 | | 9.0 | | 9.0 | |

TABLE 8-D.—TESTS IN SYNTHETIC SEAWATER AFTER AGING

| | Polysaccharide material, p.p.b. | | | | | | | | | | | |
|---|---|---|---|---|---|---|---|---|---|---|---|---|
| | 0.50 | | 0.50 | | 0.50 | | 0.75 | | 0.75 | | 0.75 | |
| | Cross-linking agent, p.p.b. | | | | | | | | | | | |
| | 2 | | 6 | | 12 | | 2 | | 6 | | 12 | |
| | °Fann | Apparent viscosity | °Fann | Apparent viscosity | °Fann | Apparent viscosity | °Fann | Apparent viscosity | °Fann | Apparent viscosity | °Fann | Apparent viscosity |
| R.p.m.: | | | | | | | | | | | | |
| 600 | 16 | 8 | 15 | 7.5 | 18 | 9 | 23 | 11.5 | 26 | 13 | 28 | 14 |
| 300 | 10.5 | 10.5 | 9 | 9 | 11 | 11 | 16 | 16 | 16 | 16 | 18 | 18 |
| 200 | 8 | 12 | 6 | 9 | 8 | 12 | 13 | 19.5 | 12 | 18 | 13 | 19.5 |
| 100 | 5.5 | 16.5 | 4 | 12 | 5 | 15 | 9 | 27 | 8 | 24 | 9 | 27 |
| 6 | 1.5 | 73.5 | 1 | 49 | 2 | 98 | 3 | 147 | 2.5 | 122.5 | 3 | 147 |
| 3 | 1.5 | 147 | 1 | 98 | 1.5 | 147 | 2 | 196 | 2 | 196 | 2.5 | 245 |
| Initial gel, lb./100 sq. ft. | 2 | | 1 | | 2 | | 4.5 | | 5 | | 3 | |
| pH | 7.9 | | 8.1 | | 8.1 | | 7.9 | | 8.0 | | 8.0 | |

EXAMPLE IX

As an example of the utilization of the drilling fluid of the present invention, details of a field test in the Delaware Basin of west Texas will be exemplified.

As is well known to those skilled in the art, the Ellenberger formation at depths to 25,000 feet is an important drilling target. To reach this target the troublesome Wolfcamp and Pennsylvanian formations must be penetrated. For drilling in this area various mud types have been used, including weighted brines, heavy solutions, lignosulfonate muds, extended bentonite systems as well as various types of oil phase fluids.

With deeper drilling it is desirable to use fluids delivering maximum horsepower at the bit. It is also highly desirable that the fluids show maximum hole cleaning capabilities at low annular velocities to reduce hydraulic erosion as well as the horsepower requirements of the pumps.

The drilling fluid of the present invention has these characteristics and was selected to drill the above-mentioned formations in Reeves County, Tex. This well was drilled to approximately 11,500 feet with a brine fluid, at which point 10¾-inch intermediate casing was set. To save rig time, the volume of the drilling fluid of the present invention required to displace the hole was prepared in a mixing tank and stored on location to avoid delay after the casing had been run and cemented.

The mud was prepared with 0.975 p.p.b. of the macromolecular polysaccharide material and 3.8 p.p.b. of the cross-linking agent, with the pH adjusted with 0.375 p.p.b. sodium hydroxide. The system was treated with 0.1 p.p.b. of a chlorinated phenol as a biocide. The makeup water was from a well near the location, which contained 9,000 p.p.m. chloride and 1,300 p.p.m. total hardness. Some of the mud was prepared with this water after it was passed through a water softener, which reduced the total hardness to 300 p.p.m. The remainder of the mud was prepared with unsoftened water directly from the well. Essentially the same mud properties were obtained with either water. With the present drilling fluid it is not necessary to treat the water to lower the total hardness as is necessary with bentonite and extended bentonite systems. If the water were not softened, it would take approximately 100 p.p.b. of bentonite to deliver the same "viscosity" as one pound of cross-linked polysaccharide component.

The macromolecular polysaccharide material was added at the rate of ten minutes per sack, while the metal ion buffered cross-linking agent was added at the rate of 16 sacks per 20 minutes. Sodium hydroxide was added every 30 minutes to adjust the pH to 8.0. The total mixing time was a little over two hours.

After drilling the casing shoe, the brine fluid was displaced with the present drilling fluid. Immediately upon return of the drilling fluid system, an increased volume of cuttings was observed coming over the shaker, denoting improved hole cleaning.

It should be pointed out that considerable hole instability was experienced while drilling with the brine fluid prior to setting casing, as indicated by several hundred feet of hole-fill after trips. This shale condition was improved with the present drilling fluid. When the mud weight was increased to approximately 10.8 p.p.g., the hole-fill problem was essentially eliminated.

The mud weight was gradually increased to 14.7 p.p.g. near 15,000 feet. Despite the increase in mud weights, the fluid continued to be gas cut from 1 to 2 p.p.g. during most of the interval drilled. The larger portion of this gas escaped at the flow line, with the remainder being removed with a degasser. It was therefore operationally demonstrated that this fluid could be quite effectively degassed.

The present drilling fluid exhibited very stable flow properties with no significant change noted over extended periods. The mud weight was increased in anticipation of abnormal gas pressure. Despite these changes, however, the flow properties remained relatively constant. Maintenance for the entire test was at the rate of 0.084 lb. of polyelectrolyte component and 0.008 lb. of polysaccharide component per barrel per day. No bentonite was added at any time—nor was a centrifuge used.

The shear-thinning property of the mud was monitored by determining the shear stress—shear rate characteristics over a wide range of shear rates, using a capillary viscometer. The apparent viscosity of the fluid was calculated, using the data from these measurements, and plotted versus the shear rate. The mud exhibited good shear-thinning characteristics over the entire weight range even though the viscosity level rose with increasing weight.

Calculated pressure drops from standard pressure loss equations were continually higher by 150 to 250 p.s.i. than was indicated by the standpipe pressure gauge. Even with the considered inaccuracies involved in making this type of calculation, the recorded pump pressure was always less than the calculated pressure loss in the system.

Samples of this drilling fluid were taken at various drilling depths from the flow line and the mud pit and were tested as in previous examples for shear-thinning characteristics. It ws found that the drilling fluid showed excellent rheological properties of maximum penetration rate, as shown in the following table.

TABLE 9

| | Depths, feet | | | | | | | | | | | |
|---|---|---|---|---|---|---|---|---|---|---|---|---|
| | 11,490 | | 11,960 | | 12,923 | | 13,357 | | 13,928 | | 14,974 | |
| | °Fann | Apparent viscosity | °Fann | Apparent viscosity | °Fann | Apparent viscosity | °Fann | Apparent viscosity | °Fann | Apparent viscosity | °Fann | Apparent viscosity |
| R.p.m.: | | | | | | | | | | | | |
| 600 | 26 | 13 | 44 | 22 | 45 | 22.5 | 35 | 17.5 | 38 | 19 | 56 | 28 |
| 300 | 13 | 19 | 32 | 32 | 31 | 31 | 22 | 22 | 28 | 28 | 39 | 39 |
| 200 | 16 | 24 | 26 | 39 | 25 | 37.5 | 17 | 25.5 | 23 | 34.5 | 33 | 49.5 |
| 100 | 12 | 36 | 19 | 57 | 17 | 51 | 11 | 33 | 18 | 54 | 26 | 78 |
| 6 | 4 | 196 | 5 | 256 | 5 | 256 | 4 | 196 | 9 | 441 | 33 | 637 |
| 3 | 3 | 294 | 3 | 294 | 5 | 490 | 3 | 294 | 9 | 882 | 9 | 882 |

The ratio of metal ion buffered cross-linking agent to macromolecular polysaccharide material can vary considerably, depending on the particular environments and circumstances surrounding drilling use without encountering any metal ion overtreatment effect. For example, formation characteristics, bore-hole properties, drilling depth, contaminants, temperatures and pressures encountered, and drilling fluid weight will influence the determination of quantities of cross-linking agent and macromolecular polysaccharide material to be utilized in order to achieve the desired effect. Because of this it is impossible to specifically state nominal ratios under all environments. Those skilled in the art of drilling will be able to easily determine needed ratios by testing samples obtained from the borehole, checking formation characteristics, and by otherwise determining the rheological and other properties that will be required. Nevertheless, it can be stated that, under most drilling conditions, in order to obtain satisfactory shear-thinning drilling fluid properties resulting from cross-linking the macromolecular polysaccharide material with the cross-linking agent of the present invention, a 4-to-1 cross-linking agent-to-polysaccharide ratio can be effectively utilized. Our drilling fluid has been found readily adaptable to all drilling environments, being effective in fresh water, salt solutions, and in brines, utilizing cross-linking agent-to-polysaccharide ratios as low as 1-to-1 and as high as 24-to-1.

It is important to note that, while cross-linking agents utilized in the prior art are sometimes able to produce cross-linked polysaccharide solutions having satisfactory rheological characteristics at p.p.b. levels which are somewhat lower than those suggested when using the cross-linking agent of the present invention, these characteristics are extremely difficult to control. A minor miscalculation in p.p.b. concentration for these prior art cross-linking materials will often result in drastic metal ion overtreatment effects which, in turn, drastically affect rheological characteristics. It is often desirable to utilize increased p.p.b. levels of a cross-linking agent for reasons which are secondary to rheology. For example, when utilizing a cross-linking agent in drilling fluids, the material may also serve the office of borehole stabilizer and filtration control agent. Under many drilling environments these functions cannot be effectively accomplished at p.p.b. levels of 0.5 to 1.0. Thus, although satisfactory, though uncontrolled, rheology may be achieved utilizing prior art cross-linking agents at these low p.p.b. levels, other drilling fluid functions cannot be achieved. The utilization of the cross-linking agent in the present invention in conjunction with a polysaccharide material enables controlled rheology at increased p.p.b. leevls, permitting sufficient material to be added for borehole stabilization, etc.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What we claim is:

1. A method of drilling a subterranean well comprising circulating in said well while drilling an aqueous drilling fluid composition consisting essentially of the product produced by the steps of:
   (A) Dissolving in an aqueous solution a bacterially modified carbohydrate produced by the action of bacteria of the genus Xanthomonas on a carbohydrate;
   (B) Adding to said solution a metal ion buffered cross-linking agent consisting essentially of (1) a lignosulfonate and (2) chrome sulfate of one-third basicity or less, the ratio of said cross-linking agent to said modified carbohydrate being from about 1-to-1 to about 24-to-1, the chromium content of the said cross-linking agent being from between about 4% to about 10% by weight;
   (C) Adjusting the pH of the aqueous solution to between about 6 and about 7 to initiate cross-linking of the modified carbohydrate;
   (D) Stirring the aqueous solution to prevent high pH localization; and
   (E) Readjusting the pH of the aqueous solution up to about 11.0 to complete cross-linking of the modified carbohydrate, said cross-linked carbohydrate being present in said aqueous solution in an amount sufficient to increase the viscosity thereof.

2. The method of claim 1 wherein the said bacterially modified carbohydrate is produced by the action of the bacteria Xanthomonas campestris on said carbohydrate.

3. The method of claim 1 wherein the lignosulfonate is sodium lignosulfonate.

4. The method of claim 1 wherein the ratio of the cross-linking agent to the modified carbohydrate is about 4-to-1.

5. The method of claim 1 in which to said drilling fluid composition is additionaly added magnesium chloride in at least about 3.5% by weight of the cross-linking agent.

References Cited

UNITED STATES PATENTS

| | | | |
|---|---|---|---|
| 3,243,000 | 3/1966 | Patton et al. | 252—8.5 X |
| 2,935,504 | 5/1960 | King et al. | 252—8.5 X |
| 3,076,759 | 2/1963 | Van Dyke et al. | 252—8.5 |
| 2,491,436 | 12/1949 | Barnes | 252—8.5 |

FOREIGN PATENTS

| | | | |
|---|---|---|---|
| 1,063,686 | 3/1967 | Great Britain | 252—8.5 C |

HERBERT B. GUYNN, Primary Examiner

U.S. Cl. X.R.

175—65

UNITED STATES PATENT OFFICE
CERTIFICATE OF CORRECTION

Patent No. 3,699,042   Dated Oct. 17, 1972

Inventor(s) William C. Browning and Billy G. Chesser

It is certified that error appears in the above-identified patent and that said Letters Patent are hereby corrected as shown below:

Col. 3, line 72, delete the word "Rheologoy" and insert the word --Rheology--. Col. 11, line 31, delete the word "chrominm" and insert the word --chromium--. Col. 11, line 74, delete the word "chrom" and insert the word --chrome--. Col. 13, line 1, delete the word "in" and insert the word --is--. Col. 23, middle column, 5th line, delete the word "marcomolecular" and insert the word --macromolecular--. Table 6-A, in the title, delete the letters "p.p.5" and insert the letters --p.p.b.--. Col. 30, line 14, delete the word "anticipiation" and insert the word --anticipation--. Col. 30, line 38, delete the letters "ws" and insert the word --was--.

Signed and sealed this 16th day of April 1974.

(SEAL)
Attest:

EDWARD M.FLETCHER,JR.
Attesting Officer

C. MARSHALL DANN
Commissioner of Patents